US 11,341,518 B1

United States Patent
McCurdy et al.

(10) Patent No.: US 11,341,518 B1
(45) Date of Patent: May 24, 2022

(54) PREDICTIVELY ESTIMATING PROMOTION CONVERSIONS

(71) Applicant: Pinterest, Inc., San Francisco, CA (US)

(72) Inventors: Sean R. McCurdy, San Francisco, CA (US); Zheng Fang, Seattle, WA (US); Rohil Bhansali, Seattle, WA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 17/103,595

(22) Filed: Nov. 24, 2020

(51) Int. Cl.
*G06Q 30/02* (2012.01)
*G06K 9/62* (2022.01)
*G06N 20/00* (2019.01)

(52) U.S. Cl.
CPC ....... *G06Q 30/0201* (2013.01); *G06K 9/6259* (2013.01); *G06N 20/00* (2019.01); *G06Q 30/0242* (2013.01); *G06Q 30/0272* (2013.01); *G06Q 30/0277* (2013.01)

(58) Field of Classification Search
CPC .......... G06Q 30/0201; G06Q 30/0242; G06Q 30/0272; G06Q 30/0277; G06K 9/6259; G06N 20/00
USPC ....................................................... 705/7.29
See application file for complete search history.

(56) References Cited

FOREIGN PATENT DOCUMENTS

AU         2009225342 A1 *   4/2010   ......... G06Q 30/0222

OTHER PUBLICATIONS

Swiftadmin, A beginner's guide to predictive analytics, 2021 (Year: 2021).*

* cited by examiner

*Primary Examiner* — Tarek Elchanti
(74) *Attorney, Agent, or Firm* — Athorus, PLLC

(57) ABSTRACT

An online host for conducting a promotion campaign is presented. Online behaviors of subscribers exposed by the promotion campaign are tracked for determining conversion counts for the promotion campaign. For exposed subscribers whose online behaviors are not sufficiently available to the online host to determine conversion counts (non-measurable subscribers), a machine learning model is trained to predict conversion counts based on online behaviors that are conducted on internet locations under control of the online service, and further trained to determine an estimated error rate regarding the predicted conversion counts. Conversion counts for a promotion campaign are determined according to an analysis of the online behaviors of the exposed subscribers whose online behaviors are sufficiently available to the online host to determine conversion counts (measurable subscribers), and according to the predicted conversion counts of the non-measurable subscribers with an estimated error rate that meets or exceeds a predetermined threshold.

20 Claims, 11 Drawing Sheets

PREDICTIVELY ESTIMATING PROMOTION CONVERSIONS

BACKGROUND

Many online services are created and operated as being a "free service" to their subscribers/users. Indeed, these online services are viewed as "free" in the sense that they do not charge subscribers a monetary amount for the provided services. However, these online services need funds to operate, and they often obtain these funds through the promotion campaigns of third parties.

Nearly every computer user has been exposed to one or more elements of a promotion campaign. Indeed, an advertisement included within a web page is an artifact of a promotion campaign, and it is hard to imagine any computer user that has not seen one or more advertisements while navigating the Internet.

As mentioned, online services receive their funds by conducting promotion campaigns on behalf of third-party promoters, and particularly on the success of the promotion campaigns as measured by "conversions." Conversions are the desired actions or behaviors of computer users in response to exposure to a promotion campaign. Conversions may include an online service's subscriber's interaction with promoted content, a subscriber's purchase of a promoted item, and/or the inclusion of promotion content in a page requested by a subscriber (often counted as a subscriber's view or impression of the promotion content). Other types of conversions may include, by way of illustration and not limitation, instilling a knowledge or awareness of information of the promotion content, encouraging advocacy of promotion content, and the like. While there are many typical behaviors and actions that are viewed as conversions, it is up to the third-party promoter to define what behaviors and actions constitute a "conversion" for any given promotion campaign.

While some conversions may be readily detected and captured by an online service, there are many occasions in which the exposure of promotion content, either directly or indirectly, by an online service to a subscriber results in a conversion that might not be readily detected or captured by the online service. For example, based on the presentation of promotion of an item to a subscriber while viewing content of an online service, that subscriber may later purchase the promoted item by directly navigating to a web location not related to the online service to conduct the purchase. In this example, the online service's presentation of a promotion item was successful, but the actual conversion occurred in a manner that the online service might not be able to detect or report. Determining conversions by behaviors that occur "off-site" of the online service's internet location r can be challenging, even impossible, and results in under-reporting of conversion counts by the online service that carries out the promotion campaign.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
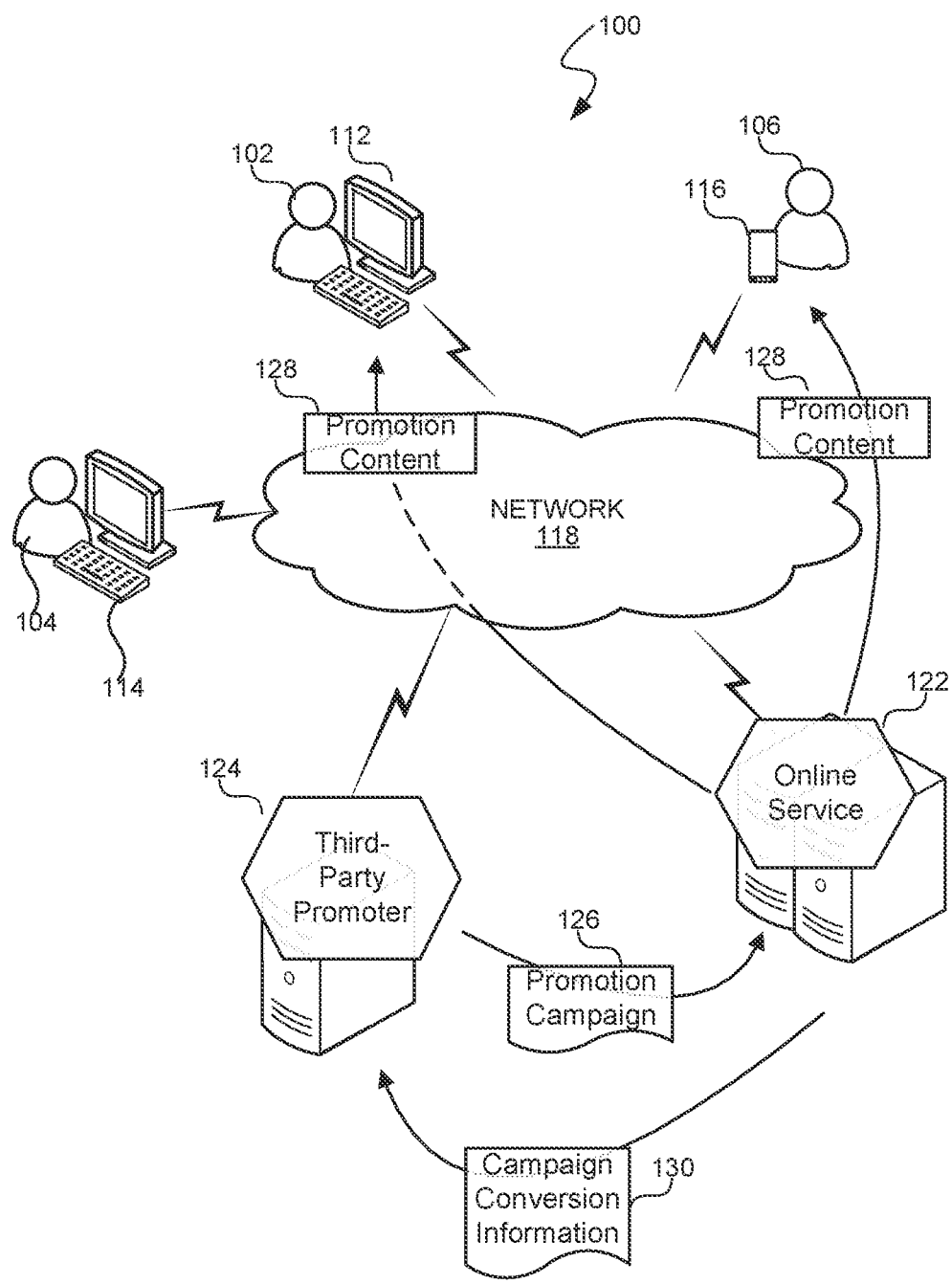
FIG. 1 is a block diagram illustrating an exemplary network environment suitable for implementing aspects of the disclosed subject matter.

In accordance with various aspects and embodiments of the disclosed subject matter, systems and methods of an online host for conducting a promotion campaign are presented. Online behaviors, activities, and/or actions of subscribers targeted by the promotion campaign, as well as other subscribers who are not targeted but are exposed to the promotion content, are tracked for determining conversion counts for the promotion campaign. For exposed subscribers (non-measurable subscribers) whose online behaviors are not sufficiently available to the online host to determine conversion counts, especially in regard to behaviors and actions that are conducted on internet locations that are not under the control of the online service, a machine learning model is trained to predict conversion counts for these subscribers based on their online behaviors that are conducted on internet locations under control of the online service. The machine learning model is further trained to determine an estimated error rate regarding the predicted conversion counts. In various embodiments, conversion counts for exposed subscribers of a promotion campaign, whose online behaviors are sufficiently perceivable to the online host to determine conversion counts (i.e., measurable subscribers), are determined according to a determinative analysis of their online behaviors and actions. A promotion campaign's overall conversion counts include the predicted conversion counts of the non-measurable subscribers with an estimated error rate that meets or exceeds a predetermined threshold, as well as the determined conversion counts of the measurable subscribers.

In accordance with additional aspects and embodiments of the disclosed subject matter, a method of an online service for determining conversion counts of a promotion campaign is presented. The method includes conducting a third-party promotion campaign of presenting promoted content on behalf of a third-party promoter to a plurality of targeted subscribers of a corpus of subscribers of the online service. Online behaviors, actions and/or activities of the plurality of exposed subscribers (including targeted subscribers) are captured, these online behaviors regarding the promoted content of the third-party promotion campaign. For each of the plurality of exposed subscribers, a determination is made as to whether a currently-iterated subscriber is a measurable subscriber or a non-measurable subscriber. A measurable subscriber is an exposed subscriber of the online service whose online behaviors, actions and/or activities on internet sites outside the control of the online service are still accessible to and can be evaluated by the online service. In relation to the promotion campaign, a machine learning model is trained to predict a conversion count with a corresponding estimated error rate of the predicted conversion count for a given subscriber (either a measurable or non-measurable subscriber) of the plurality of exposed subscribers regarding the third-party promotion campaign. A non-measurable subscriber is a subscriber whose online behaviors, actions and/or activities on internet sites outside the control of the online service are not accessible to and/or cannot be evaluated by the online service. The machine learning model is trained according to at least some of the exposed subscribers' online behavior regarding the third-party promotion campaign. According to various embodiments and with the machine learning model trained, for each measurable subscriber, a conversion count of a measurable subscriber is determined for the third-party promotion campaign. This determination is made according to an evaluation of the online behaviors of the measurable subscriber. This conversion count is added to an overall conversion count for the promotion campaign. Additionally, for each non-measurable subscriber, the online behaviors of the non-measurable subscriber on internet locations under control of the online service are processed by the trained machine learning model. The results of the processing include a predicted conversion count and a corresponding estimated error rate of the conversion count for the non-measurable subscriber with regard to the third-party promotion campaign. This predicted conversion count is added to the overall conversion count for the promotion campaign upon a determination that the predicted estimated error rate of the conversion count for the non-measurable subscriber falls below a predetermined error rate threshold.

According to additional aspects of the disclosed subject matter, a computer system configured to conduct a campaign promotion of an online service for a promoter is presented. In operation, one or more executable modules of the computer system conducts a third-party promotion campaign on behalf of a third-party promoter to a plurality of targeted subscribers of a corpus of subscribers of the online service. The online behaviors, actions and/or activities of the plurality of targeted and exposed subscribers regarding the promoted content of the third-party promotion campaign are captured and stored in a campaign/behavior data store. An exposed subscriber is a subscriber of the online service that, while not specifically targeted for the promotion campaign, is exposed to the promotion content of the promotion campaign, and whose online actions and behaviors may be evaluated and included as conversions. For each exposed subscriber of the plurality of targeted and/or exposed subscribers, a determination is made as to whether a given subscriber is a measurable subscriber or a non-measurable subscriber. A measurable subscriber is an exposed subscriber of the online service whose online behaviors, actions and/or activities on internet sites outside the control of the online service, particularly in regard to or in response to the promotion content of the promotion campaign, are still accessible to and can be evaluated by the online service. In regard to the promotion campaign, a machine learning model is trained to predict a conversion count and an estimated error rate for non-measurable subscribers of the plurality of targeted and/or exposed subscribers regarding the third-party promotion campaign, all according to the non-measurable subscribers' online behaviors, actions and/or activities regarding the third-party promotion campaign. A non-measurable subscriber is an exposed subscriber whose online behaviors, actions and/or activities on internet sites outside the control of the online service are not accessible to and cannot be evaluated by the online service, particularly in regard to actions, behaviors and/or activities related to or in response to the promotion campaign. For each measurable subscriber of the plurality of targeted and/or exposed subscribers, a conversion count for the measurable subscriber may be determined in regard to the third-party promotion campaign according to an evaluation of the online behaviors, actions and/or activities of that measurable subscriber. The determined conversion count of the measurable subscriber is added to a total conversion count for the third-party promotion campaign. Alternatively, for each non-measurable subscriber of the plurality of targeted and/or exposed subscribers, the accessible online behaviors, actions and/or activities of the non-measurable subscriber may be processed by the trained machine learning model to determine a predicted conversion count and an estimated error rate of the conversion count for the non-measurable subscriber regarding the third-party promotion campaign. The predicted conversion count for the non-measurable subscriber is added to a total conversion count for the third-party promotion campaign upon a determination that the estimated error rate falls below a predetermined error rate threshold.

For various reasons, more and more computer users are utilizing tools that reduce the amount of information that third parties can view to ascertain those users' online behaviors. For online services, this lack of insight into its subscribers' online activity and behavior has resulted in a significant drop in reported conversion rates for promotion campaigns. Advantageously, aspects of the disclosed subject matter are directed at predictively determining the actual conversion counts of subscribers of an online service, with low error. As will be described in greater detail below, predictive determinations of conversion counts for non-measurable subscribers, whose online activities and behaviors are not otherwise readily determined, are made by a trained machine learning model. Where an estimated error rate for predicted conversion counts for the non-measurable subscriber is below a predetermined threshold, those predicted conversion counts are included with measurable conversion counts in reporting total conversion counts for a promotion campaign.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

Additionally, for clarity and by way of definition, a "targeted" subscriber is a subscriber of an online service that is specifically targeted in regard to a promotion campaign. An "exposed" subscriber is a subscriber of an online service that is not specifically targeted in regard to a promotion campaign, but who has been exposed to the promotion campaign and whose online actions, behaviors and/or activities relating to or in response to the promotion campaign should be considered in determining conversion counts for the promotion campaign. Because the set of exposed subscribers includes the set of targeted subscribers, for simplicity in presenting the disclosed subject matter, reference will generally be made to "exposed" subscribers.

To illustrate aspects of the disclosed subject matter, reference is now made to the figures. FIG. 1 is a block diagram illustrating an exemplary network environment 100 suitable for implementing aspects of the disclosed subject matter. The exemplary network environment 100 includes one or more persons/computer users that connect to a network 118 via a computing device. By way of illustration, the exemplary network environment includes computer users 102, 104 and 106, each connecting to a network 118 via computing devices 112, 114 and 116, respectively. As will be readily appreciated, computer users can connect to a network, such as network 118, via their computing devices using wired and/or wireless connections, which are known in the art. Additionally, and by way of illustration and not limitation, those skilled in the art will appreciate that suitable user computing devices include mobile phone devices (such as computing device/mobile phone 116), tablet computing devices, laptop computers, the so-called phablet computing devices (the hybrid phone/tablet computing devices), desktop computing devices (such as desktop computers 112 and 114), mini- and/or mainframe computing devices, and the like.

By way of definition, the network 118 is a computer network, also sometimes referred to as a data network. At its core, a computer network is fundamentally a telecommunications network which allows computers and/or computing devices, such as computing devices 112, 114 and 116, to exchange information and data. In computer networks, networked computing devices, sometimes referred to as nodes in the network, are enabled to exchange data with each other, often using a standard protocol. As mentioned above, the connections between nodes are established using cable media (wired connections) or wireless media (wireless connections), or a combination of both. While the best-known computer network may be the Internet, the disclosed subject matter is not limited to any particular configuration or implementation of a computer network. Indeed, elements of the disclosed subject matter may be suitably and satisfactorily implemented on wide area networks, local area networks, enterprise networks, private network, and the like.

In addition to computer devices associated with computer users, online services and processes may also be connected to the network 118. Indeed, as shown in FIG. 1, also communicatively coupled to the network 118 is an online service 122. By way of definition, an online service corresponds to a service that is connected to and operates on the network, interacts with and is accessible to computer users, via computing devices. For purposes of this disclosure, the computer users of an online service, such as online service 122, are referred to as subscribers, i.e., subscribers of the online service. For purposes of the illustrated example of FIG. 1, computer users 102, 104 and 106 are viewed as subscribers of online service 122.

The exemplary network environment 100 further illustrates a third-party promoter 124 being connected to the network 118. As shown in FIG. 1, the third-party promoter 124 provides information of a promotion campaign 126 for execution by the online service 122. As those skilled in the art will appreciate and in accordance with the example of FIG. 1, in executing a promotion campaign 126 for the third-party promoter, the online service 122 will often provide promotion content 128 of a promotion campaign, such as promotion campaign 126, to one or more of the service's subscribers, such as subscribers 102 and 106. In addition to presenting promotion content, the online service 122 tracks the responsive behaviors, actions and/or activities of the subscribers in relation to having been presented with the promotion content. The online behaviors, activities and/or actions are tracked in order to detect and count conversions. At the conclusion of the promotion campaign, the online service 122 aggregates the conversion information of the exposed subscribers (i.e., subscribers exposed to the promotion campaign and whose online actions, activities and/or behaviors regarding or in response to the promotion campaign should be considered in counting conversions), and provides overall conversion information 130 back to the third-party promoter. Details regarding the determination of conversion counts for a promotion campaign will be described in greater detail below.

Figure 2:
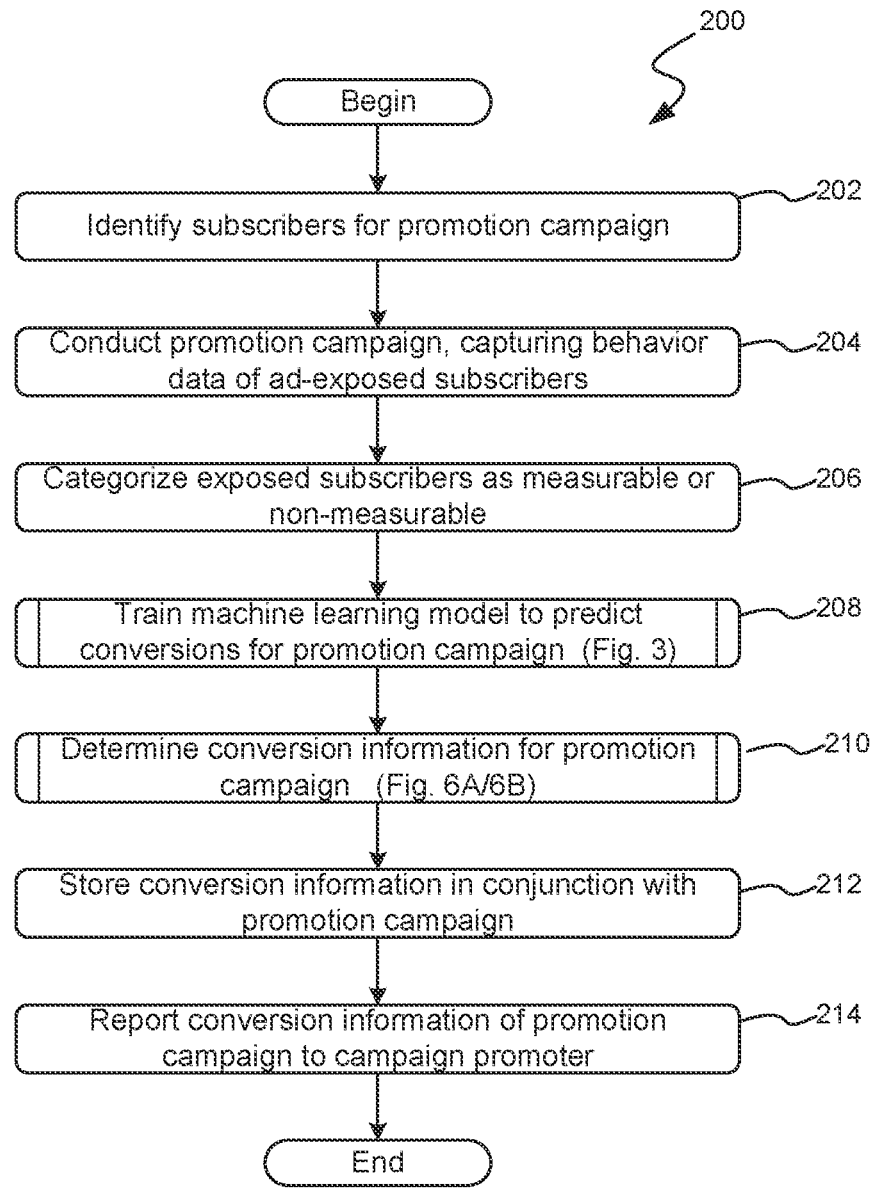
FIG. 2 is a flow diagram illustrating an exemplary routine for conducting a promotion campaign and reporting conversion counts for the promotion campaign, in accordance with aspects of the disclosed subject matter.

Regarding the execution of a promotion campaign, reference is now made to FIG. 2. FIG. 2 is a flow diagram illustrating an exemplary routine 200, as implemented by an online service, such as online service 122, for conducting a promotion campaign and reporting conversion counts for the promotion campaign, in accordance with aspects of the disclosed subject matter. Regarding the promotion campaign, typically though not exclusively, the promotion campaign will be a campaign conducted on behalf of a third party, such as described above in FIG. 1 regarding the promotion campaign 126 of third-party promoter 124. Alternatively, however, the promotion campaign may be one designed and/or devised by the online service executing the promotion campaign for the benefit of the online service.

Regarding the execution of the promotion campaign and beginning at block 202, typically a set of subscribers, referred to as targeted subscribers, of the online service is identified as being those subscribers that will be targeted in the promotion campaign. In identifying this set of targeted subscribers, information associated with or part of the promotion campaign may be utilized to identify/select the subscribers for the promotion campaign. This information may include, by way of illustration and not limitation, subscriber demographic information (e.g., age, gender, geographic location, etc.), subscriber preferences, specific subscriber behaviors, and the like. In some alternative embodiments, however, rather than identifying a targeted set of subscribers for exposure to promotion content of a promotion campaign, specific online behaviors or activity (e.g., accessing a particular content item on the online service or creating a new account on the online service), particular timing or times of day, emergent conditions, and the like may be used to identify exposed subscribers for exposure to a promotion campaign in an emerging and ongoing fashion in conjunction within the boundaries and limits of the promotion campaign.

At block 204, the promotion campaign is conducted by the online service, generally directed to the targeted subscribers. As those skilled in the art will appreciate, conducting a promotion campaign typically includes presenting promotion content to the targeted subscribers of the online service's set of subscribers in accordance with information of the promotion campaign. FIG. 1 illustrates the promotion content 128 being presented to subscribers 102 and 106. Often, though not exclusively, the promotion content is included for presentation with other content directed to, or requested by, a targeted subscriber. Promotion content may take on any number of forms including, by way of illustration and not limitation, a graphic, audio content, an audio/visual content, a subscriber-interactable widget or control, background content, and the like. Of course, while the promotion campaign may be initially and/or particularly directed to this set of targeted subscribers, other subscribers of the online service may also be exposed to the promotion content, and the online actions, activities and/or behaviors of these "exposed" subscribers, in relation to or in response to the promotion content, should be evaluated for countable and reportable conversions. By way of illustration and not limitation, this exposure may occur if a targeted subscriber were to repost the promotion campaign content, and an un-targeted subscriber were to view the promotion campaign. In this example, subsequent online behaviors, actions and or activities of the un-targeted subscriber (now an exposed subscriber) taken in relation to or in response to exposure to the promotion content should be evaluated and considered in counting conversions to the promotion campaign.

As those skilled in the art will appreciate, in conducting the promotion campaign, timing of conducting the campaign, the type of promotion content presented, duration of the promotion campaign, presentation limits, and the like are controlled according to information associated with or part of the promotion campaign 126. Additionally, desired behaviors, actions and/or activities of exposed subscribers are also defined, including those that may count as a "conversion." For purposes of this disclosure, a conversion is a behavior, activity or action, typically as identified by the promotion campaign (or information relating to the promotion campaign), of an exposed subscriber. By way of illustration and not limitation, a conversion may include interacting with promotion content, the presentation of promotion content to an exposed subscriber (counted as a "viewing" or impression by the exposed subscriber), the purchase of an item related to the promotion campaign, a request by an exposed subscriber for additional or related information of an item related to the promotion campaign, an implicit or explicit indication of preference (or non-preference) of some element related to the promotion campaign, and the like. A conversion may also comprise a series or aggregation of multiple behaviors, activities and/or actions. Further, in many if not most promotion campaigns, there may be multiple behaviors and/or actions that, for any given exposed subscriber, may be counted as one or more conversions. Additionally, an exposed subscriber may account for multiple conversions according to that subscriber's behaviors, actions and/or activities relating to or in response to exposure to the promotion content.

As the online actions, activities and/or behaviors of the exposed subscribers of a promotion campaign are key to identifying conversions, as an additional aspect of conducting the promotion campaign the online service tracks and records these online actions, activities and behaviors of the exposed subscribers, at least those behaviors, activities and/or actions that are conducted on or in conjunction with one or more network locations under the control of the online service. Of course, of importance are those actions, activities and behaviors that individually, or in combination, can be counted as conversions for the promotion campaign.

Those skilled in the art will appreciate that there may be many online behaviors, activities and actions of exposed subscribers that are conducted on network locations, web pages and/or sites that are not under the control of the online service. Moreover, in many instances, these actions may not be visible and/or trackable by the online service. However, these behaviors, activities and/or actions of exposed subscribers, when motivated by the presentation of or exposure to promotion content to the exposed subscribers, still represent conversions and should be included in the conversion counts reported by the online service. Of course, there will be online behaviors and actions of some of the exposed subscribers on network locations outside of the control of the online service that may be readily determined through various techniques and tools. However, more and more the number of exposed subscribers whose online behaviors and actions, outside of the network locations under the control of the online service, that may be readily determined is diminishing.

For purposes of the disclosed subject matter, exposed subscribers (or subscribers in general) whose online behaviors and actions are determinable, including behaviors and actions on internet sites (or, more generally, network sites) outside of the control of the online service, are characterized as measurable subscribers. In contrast, exposed subscribers whose online behaviors and actions on network sites outside of the control of the online service, or are only partially determinable, are characterized as non-measurable subscribers. It follows that being unable to examine and evaluate the online behaviors of exposed subscribers has led to under-reported conversion counts.

With regard to routine 200, at block 206, the exposed subscribers are classified as either measurable or non-measurable subscribers. As already suggested, this classification/determination is frequently, but not exclusively, made by an examination and evaluation of artifacts of network behaviors, actions, activities, and the like, including an examination and evaluation of the exposed subscribers' so-called "cookies" or "HTTP cookies." For example, if a given exposed subscriber's cookies can be examined by the online service, including cookies not directly related to the online service, the exposed subscriber may be viewed as a measurable subscriber. Alternatively, if network-related artifacts of online actions, behaviors, etc., of a given exposed subscriber are inaccessible, only partially accessible, or incomplete, the exposed subscriber is classified as non-measurable.

At those skilled in the art will appreciate, an HTTP (or hypertext transport protocol) cookie is a small piece of data stored on a subscriber's computer by a web browser while the subscriber is browsing a website. The stored data includes, at least in part, the computer user's activity regarding browsing a given web site. Indeed, "cookies" were designed to be a reliable mechanism for websites and/or online services to remember stateful information, and/or to record a subscriber's browsing activity. Additionally, cookies can also be used to remember pieces of information that the subscriber previously entered into form fields, such as names, addresses, and the like. Of course, these same actions or activities may constitute countable "conversions" when considered in light of the promotion content presented to an exposed subscriber.

Regarding the classification of a targeted subscriber as measurable or non-measurable, it should be appreciated that this determination may be made as a just-in-time determination as part of conducting a promotion campaign. Alternatively, in various embodiments of the disclosed subject matter, this classification may be conducted independently of any specific promotion campaign. Indeed, a classification determination of a given subscriber of a corpus of subscribers of the online service may be made in an offline and/or asynchronous manner to any promotion campaign. This determination/classification may be made due to the nature of the network artifacts: they exist and/or are saved based on a given subscriber's online behaviors and actions, irrespective of any given promotion campaign. Additionally, this classification may be made with respect to all subscribers of an online service, not just exposed subscribers. Still further, the classification of measurable/non-measurable may be an ongoing process as subscribers/computer users have dynamic control over whether artifacts are recorded or not, and/or whether artifacts may be shared among different online services.

At block 208 and according to aspects of the disclosed subject matter, either during or at the completion of the promotion campaign a machine learning model is trained for purposes of predicting conversion counts, especially for non-measurable, exposed subscribers. In addition to being trained to predict conversion counts for non-measurable subscribers for a promotion campaign, the machine learning model is also trained to predict an estimated error rate for the predicted conversion counts for the non-measurable subscribers. A discussion of training a machine learning model for this purpose is set forth below in regard to FIG. 3.

At block 210 and according to aspects of the disclosed subject matter, with a machine learning model now trained for predicting conversion counts for exposed subscribers, especially in regard to non-measurable exposed subscribers in relation to the promotion campaign, a determination of the total conversion counts for the promotion campaign is made. Determining the total conversion counts, including conversion counts of both measurable and non-measurable exposed subscribers of a promotion campaign, is set forth below in regard to routine 600A of FIG. 6A or, alternatively, routine 600B of FIG. 6B.

Regarding the timing of steps 208 and 210, it should be appreciated that these steps, individually or jointly, may be carried out during or after the conclusion of the promotion campaign.

At block 212, the total conversion counts for the promotion campaign, which advantageously may include predicted conversion counts of non-measurable exposed subscribers, is stored in conjunction with the promotion campaign in a promotion data store. At block 214, the overall conversion count information 130 is provided to the promoter of the promotion campaign. Thereafter, the routine 200 terminates.

Figure 3:
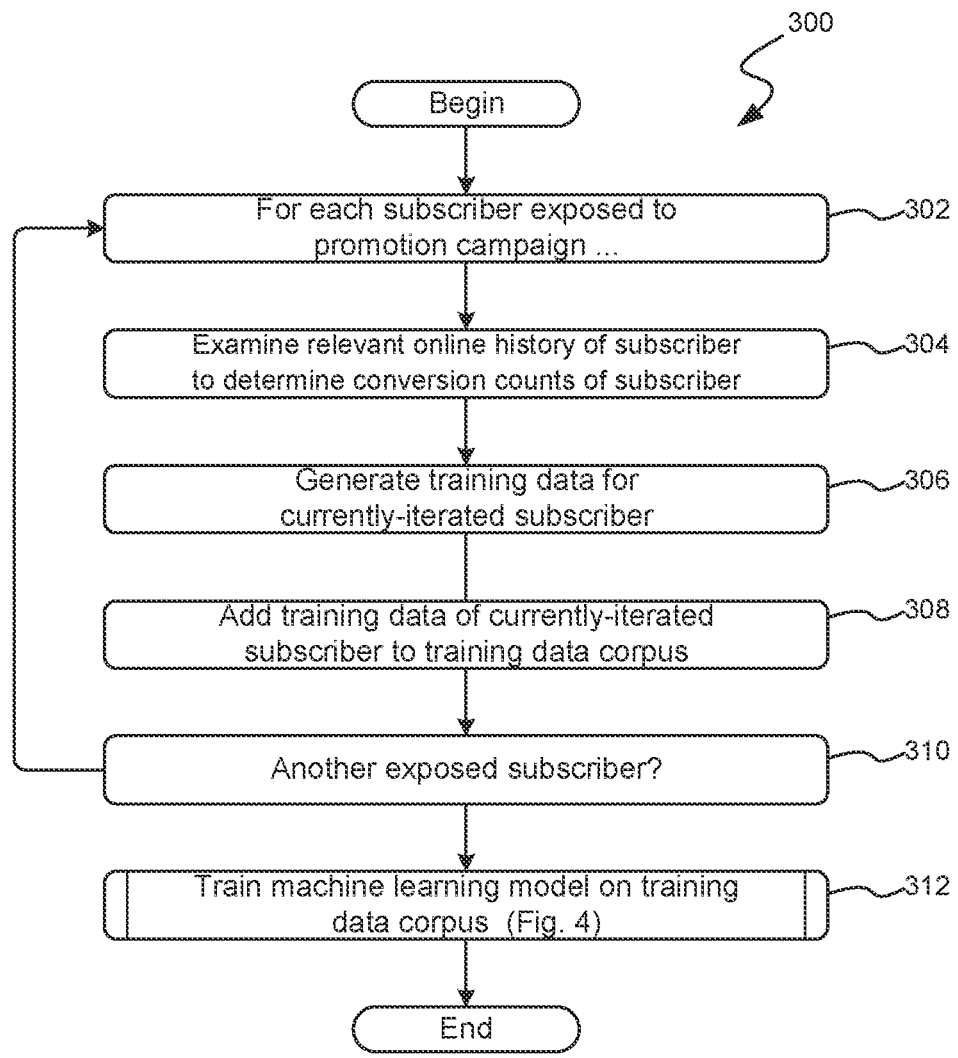
FIG. 3 is a flow diagram for training a machine learning model to generate predictive, estimated conversion counts for a promotion campaign, in accordance with aspects of the disclosed subject matter.

With regard to training the machine learning model to generate predicted conversion counts for non-measurable subscribers, reference is now made to FIG. 3. Indeed, FIG. 3 is a flow diagram of an exemplary routine 300 for training a machine learning model to generate predictive, estimated conversion counts for a promotion campaign for exposed subscribers, and especially for non-measurable subscribers, in accordance with aspects of the disclosed subject matter.

Beginning at block 302, an iteration is begun to iterate through the exposed subscribers of the promotion campaign. As part of the iteration, at block 304, an examination and evaluation of the online behaviors and actions relating to the promotion campaign of the currently-iterated exposed subscriber is made. The result of this examination and evaluation is an online history for the currently-iterated exposed subscriber, which includes a set of online behaviors, actions and activities of the exposed subscriber. In various embodiments, if the currently-iterated exposed subscriber has been classified as a measurable subscriber, an actual conversion count for the exposed subscriber in relation to the promotion campaign is determined through an examination of the online behaviors and actions of the currently iterated exposed subscriber.

At block 306, training data is generated from the online history for the currently-iterated exposed subscriber. In generating the training data, if the currently-iterated exposed subscriber is a measurable subscriber, the training data is generated such that it includes the online actions and behaviors on internet sites under control of the online service, the actual conversion counts relating to the promotion campaign, and an indication that the training data is "labeled" training data. Alternatively, if the currently-iterated exposed subscriber is a non-measurable subscriber, the training data includes the online actions and behaviors on internet sites under control of the online service (i.e., accessible but not completed online activity information), but does not include conversion count information for the currently iterated subscriber, and would include an indication that the training data is "unlabeled" training data.

After generating the training data for the currently-iterated exposed subscriber, at block 308, the training data is added to a corpus of training data for training the machine learning model. At block 310, if there are additional exposed subscribers to process, the routine 300 returns to block 302 where, in the course of the iteration, the next exposed subscriber is selected for processing. Alternatively, if the subscribers exposed to the promotion campaign have all been processed, thereby generating a corpus of training data (including labeled and unlabeled training data), the routine 300 proceeds to block 312.

At block 312, a machine learning model is trained according to the generated corpus of training data. According to aspects of the disclosed subject matter, the machine learning model is trained to generate predictive conversion counts for an exposed subscriber based on a set of online behaviors and/or actions for the subscriber, as found in an element of the training data. In addition to being trained to generate predictive conversion counts for an exposed subscriber, the machine learning model is trained to also generate an estimated error rate of the predictive conversion counts for the exposed subscriber. Advantageously, and as will be discussed in greater detail below, the combined output of a predictive conversion count and an estimated error rate of the predictive conversion count leads to improved conversion count reporting with high confidence. Training the machine learning model based on the training data is described below in regard to routine 400 of FIG. 4. After training the machine learning model, routine 300 terminates.

Figure 4:
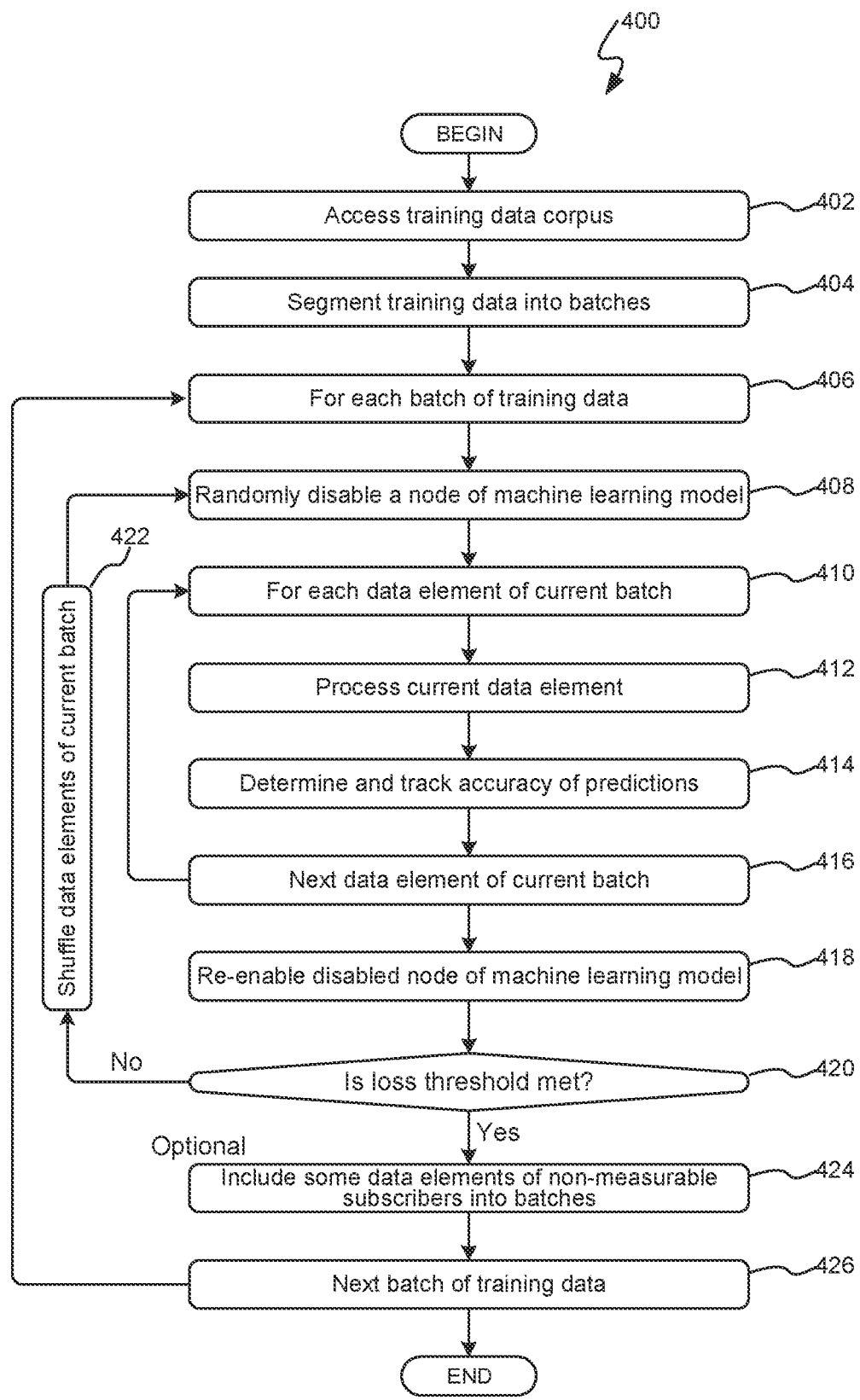
FIG. 4 is flow diagram illustrating an exemplary routine for training a machine learning model in accordance with aspects of the disclosed subject matter.

Turning to FIG. 4, FIG. 4 is a flow diagram illustrating an exemplary routine 400 for training a machine learning model in accordance with aspects of the disclosed subject matter. Advantageously and in accordance with aspects of the disclosed subject matter, the training of the machine learning model is made according to semi-supervised learning (SSL) techniques. Indeed, as those skilled in the art will appreciate, semi-supervised learning is an approach to machine learning that combines an amount of labeled data (labeled training tuples) with an amount of unlabeled data (unlabeled training tuples) during training. Frequently, though not exclusively, under semi-supervised learning, the amount of labeled data is significantly smaller than the amount of unlabeled data. Advantageously, under semi-supervised learning, the larger amount of unlabeled data, used in conjunction with a smaller amount of labeled data, results in considerable improvement in learning accuracy of the machine learning model. According to aspects of the disclosed subject matter, the semi-supervised training begins training with the labeled data and adds unlabeled data as the training progresses. Indeed, while initial training utilizes labeled data, as levels of accuracy in training are attained, unlabeled data may be incrementally added. Advantageously, adding the unlabeled data during the training of the machine learning model enhances and advances the training of the machine learning model.

Those skilled in the art will appreciate that semi-supervised training is typically used in classification with respect to a small set of known categories. However, according to aspects of the disclosed subject matter, the semi-supervised training of the machine learning model is advantageously applied to produce regression analysis that generates predictive results along a continuum or range of values, e.g., a resulting floating point value between 0.0 and 1.0 (both a predictive conversion count and an estimated error rate for the predictive conversion count).

Regarding the elements of routine 400, at block 402 the training data is accessed, where the training data has generated for the training a machine learning model to predict conversion counts with a corresponding estimated error value for a given subscriber's online actions, behaviors and/or activities. At block 404, the training data is segmented into a plurality of batches. Typically, the batches are approximately equal in size, though precise division is not mandatory. In various embodiments, batch information may be segmented according to the subscribers from which the training data is generated. For example, if the training data is generated from 1000 subscribers, the training data may be segmented into 20 batches, each batch containing data from 50 of the 1000 subscribers.

At block 406, an iteration is begun to iterate through the batches of segmented training data in training the machine learning model. As part of the training and according to aspects of the disclosed subject matter, at block 408, a node of the machine learning model that is undergoing training is disabled. Disabling a node, particularly a processing node, of the machine learning model is part of training referred to as drop-out training.

As will be appreciated by those skilled in the art, drop-out training refers to enhanced training of a machine learning model during which one or more processing nodes of the currently trained machine learning model are dropped out or disabled. To better illustrate aspects of drop-out training, reference is made to FIGS. 5A-5D. Indeed, FIGS. 5A-5D are block diagrams illustrating exemplary elements of a machine learning model 500 as may be utilized during multiple drop-out training processes, in accordance with aspects of the disclosed subject matter.

Figure 5A:
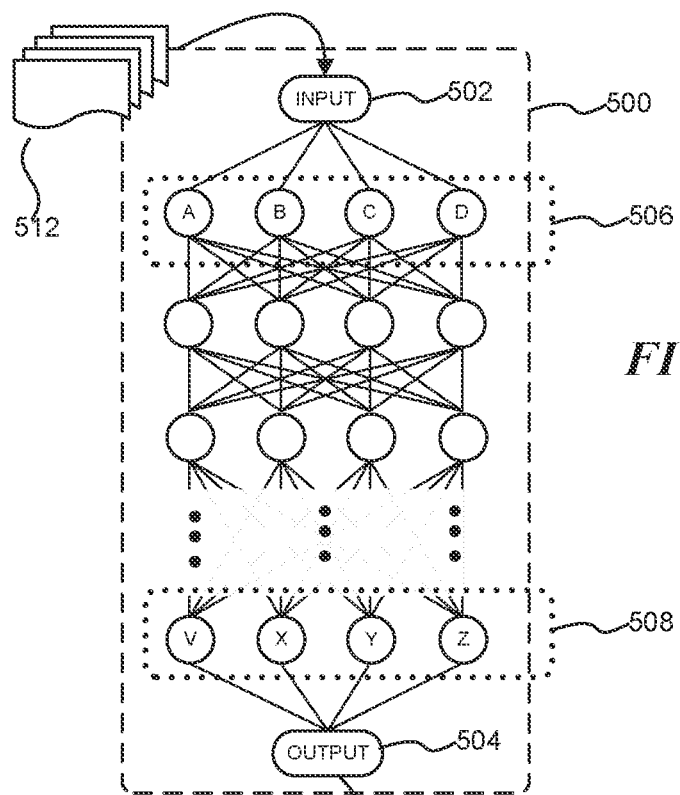
FIGS. 5A-5D are block diagrams illustrating exemplary elements of a machine learning model as may be utilized during multiple training processes, including drop-out training processes, in accordance with aspects of the disclosed subject matter.

Regarding FIG. 5A, this block diagram includes a representation of a fully-enabled machine learning model 500. This fully-enabled machine learning model 500 includes an input layer 502, typically consisting of a single processing node, and output layer 504 also consisting of a single processing node, and multiple internal, "hidden" processing layers. Each hidden layer comprises multiple processing nodes. By way of illustration, hidden layer 506 includes processing nodes A-D, and hidden layer 508 includes processing nodes V-Z. Elements of training data 512 are input to the input layer 502 of machine learning model 500, and output data 514 from the output layer 504 comprises predictive conversion counts for the given training data element 512, and further includes an estimated error rate for the predicted conversion counts. For illustration purposes, disabled processing nodes are viewed as being blacked out. Thus, each processing node of the machine learning model 500 of FIG. 5A, corresponding to a fully enabled and operational machine learning model, does not include any blacked out nodes.

In regard to the operation of a machine learning model such as the illustrative machine learning model 500, particularly as implemented as a deep neural network, and as is readily appreciated by those skilled in the art, processing nodes of the various hidden processing layers receive input from processing nodes of "upper," hidden processing layers (i.e., hidden processing layers closer to the input layer 502), with the processing nodes of the highest hidden layer, e.g., hidden layer 506, receiving processed data from the input layer 502. This transfer of information from processing nodes of upper, hidden processing layers to lower, hidden processing layers is represented by the lines between the processing nodes. Each processing node carries out one or more operations on the received data, also commonly called convolutions, that may comprise, by way of illustration and not limitation, any one or more of an arithmetic manipulation, an aggregation of values, a comparison of values, a transformation or translation of values, and the like. As shown, the result of each processing node is passed to one or more processing nodes of a lower, hidden processing layer. The output layer is the bottom-most layer and aggregates the various output values from the hidden layer above it, e.g. hidden layer 508, and generates the ultimate output data 514 of the machine learning model. In accordance with aspects of the disclosed subject matter, the output data of the output layer 504 comprises a predicted conversion count for the input tuple of subscriber behaviors, and an estimated error rate for the predicted conversion count.

Figure 5B:
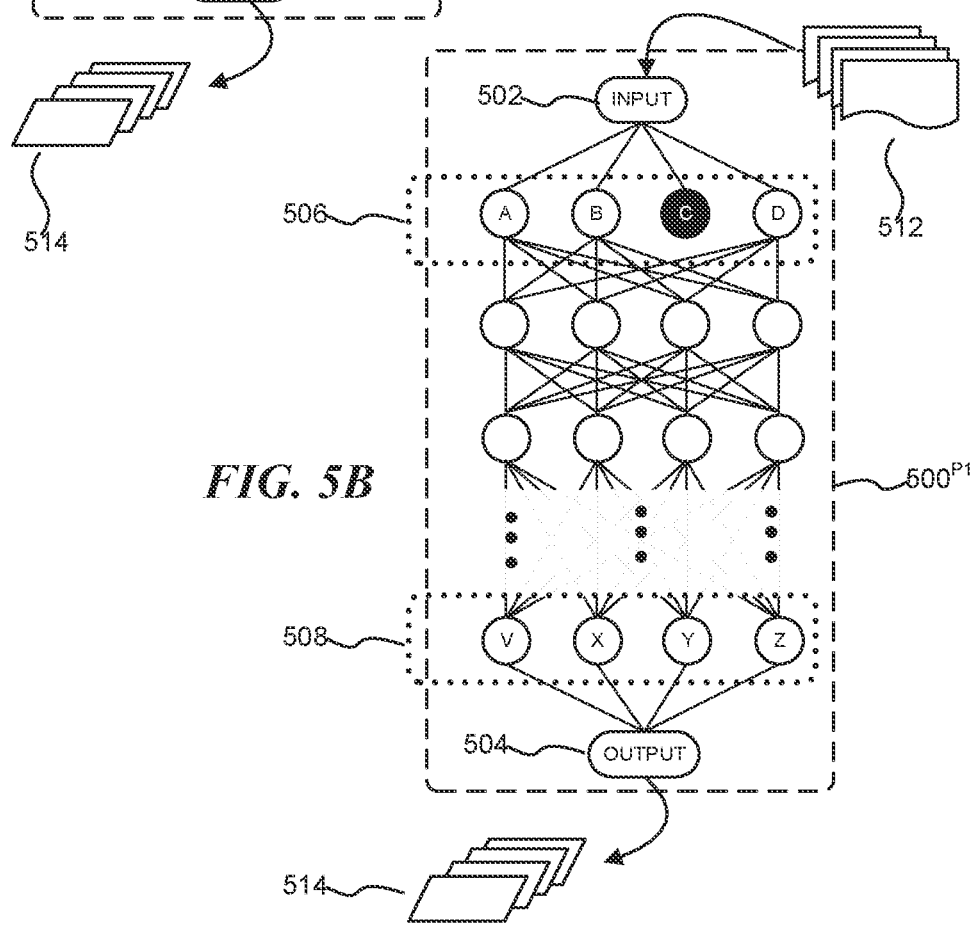

As shown in FIG. 5B, in using drop-out techniques in enhanced training of a machine learning model, one or more nodes, such as node C of hidden layer 506, of machine learning model 500$^{P1}$ (500$^{P1}$ corresponding to the machine learning model during a first iteration or period of the drop-out training), are disabled. Disabled processing nodes do not process any received input data (if they receive any, because they are disabled) and they do not pass any processed data onto processing nodes of lower-level hidden processing layers. In various embodiments of the disclosed subject matter, a disabled processing node simply passes on the input data without performing any convolutional operations. For illustration purposes and as shown in machine learning model 500$^{P1}$, node C does not pass on any output/processed data to the processing nodes of the next-lower hidden processing layer.

Figure 5C:
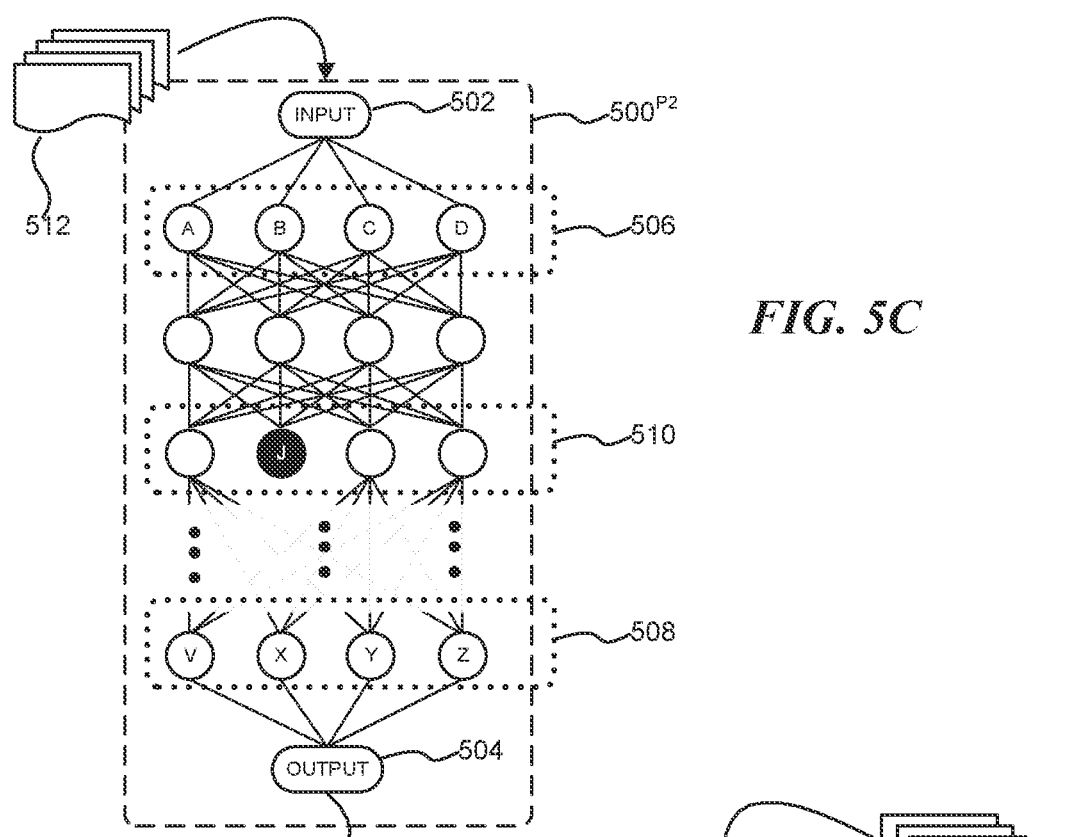
Figure 5D:
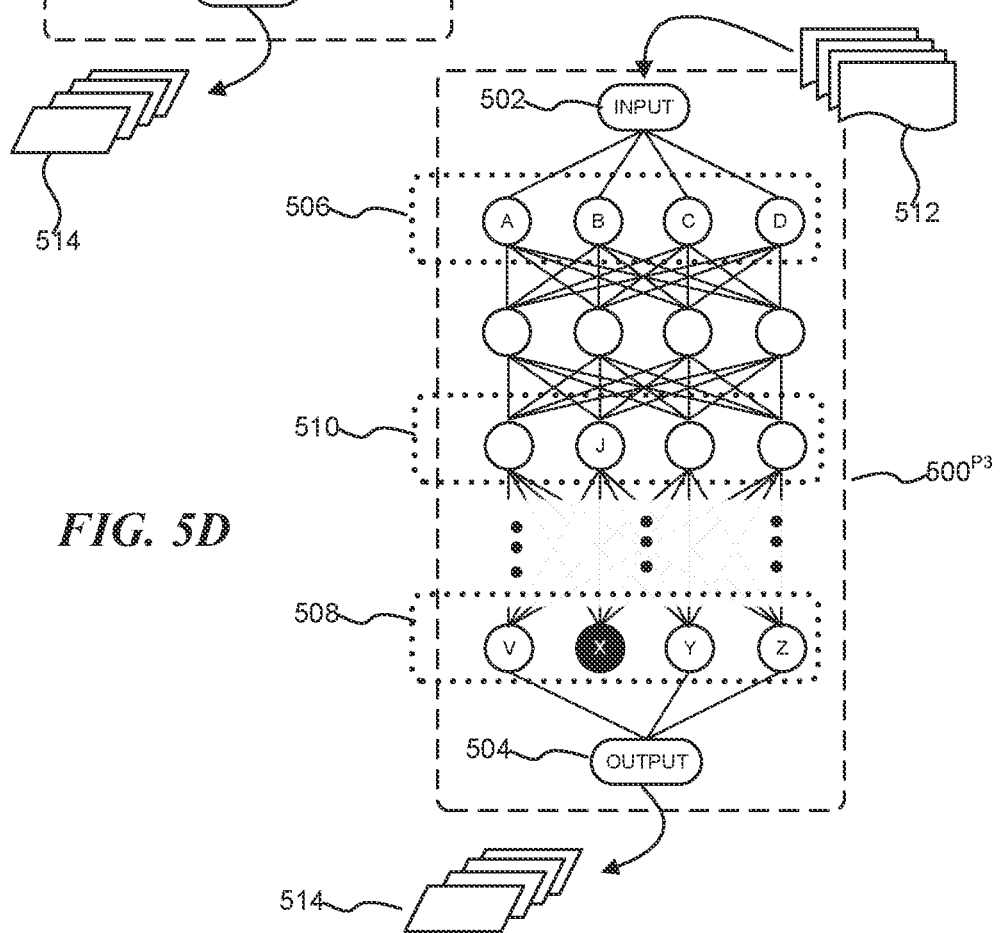

Similarly, in regard to FIG. 5C, in machine learning model 500$^{P2}$ (500$^{P2}$ corresponding to the machine learning model during a second iteration of the drop-out training), node J of hidden layer 510 is disabled whereas node C of hidden layer 506 has been re-enabled. Further, in regard to FIG. 5D, in machine learning model 500$^{P3}$ (500$^{P3}$ corresponding to the machine learning model during a third iteration of the drop-out training), node X of hidden layer 508 is disabled, and both nodes C and J of upper processing layers, previously disabled during prior iterations, are re-enabled. Advantageously, as those skilled in the art will appreciated, this drop-out training leads to improved generalization in the training of the machine learning model, which is important for including predicted conversion counts in the total conversion counts for promotion campaigns.

Returning again to routine 400 of FIG. 4, at block 410, an iteration is begun to iterate through each training data element of the current batch of training data. At block 412, the training data element is processed by the machine learning model (with the randomly disabled node). At block 414, the results of the processing of a currently-iterated data element are determined and tracked for accuracy, i.e., if it is a labeled training data element, the results are checked for accuracy against the actual conversion count. At block 416, if there are more training data elements of the current batch to process, the routine 400 returns to block 410 to continuate the iteration. Alternatively, if there are no additional training data elements to process in the current batch, the routine 400 proceeds to block 418.

At block 418, the disabled node of the machine learning model is re-enabled, so that another node (if another node is selected in the course of random drop-out) may be selected for disablement. At decision block 420, a determination is made as to whether a loss threshold corresponding to a measurement of the accuracy of the results of the current batch that have just been processed, has been met. As those skilled in the art will appreciate, as part of the machine learning training, if the results were not sufficiently accurate, the routine 400 is further trained using the current batch of training data. Thus, if the loss threshold is not met, the routine proceeds to block 422.

At block 422, the various processing nodes of the machine learning model, including parameters and hyperparameters used in training the machine learning model, are updated in order to improve performance. Additionally, the training data elements of the current batch are, typically, reshuffled. Reshuffling of training data elements ensures that the machine learning model is not trained on the order of the training data elements that are received, but rather on the training data elements themselves. After updating the processing parameters of the processing nodes of the machine learning model and reshuffling the training data elements of the current batch, the routine 400 proceeds to block 410 where another node in the machine learning model is randomly disabled. After disabling a random node of the machine learning model, the routine 400 begins, anew, the iteration of processing the training data elements of the current batch of training data.

Returning again to decision block 420, after having processed the currently-iterated batch of training data, if the loss threshold is met, the routine proceeds to block 424. At block 424, some of the non-labeled training data elements may be included within the segmented batches of training data, including but not limited to the unprocessed batches of training data, to enhance the training of the machine learning model. Thereafter, at block 426, if there are additional batches of training data to process, the routine 400 returns to block 406 to continue its processing. Alternatively, if there are no additional training data batches to process, the routine 400 terminates.

While the discussion above regarding routine 400, presented as a single pass through the training data, is illustrative of the training process, those skilled in the art will readily appreciate that nearly always the training of the machine learning model, i.e., processing all batches of the training data, is conducted numerous times in order to produce a trained machine learning model. After each epoch of training (i.e., after all batches of the training data have been processed), loss thresholds may be updated, additionally unlabeled data may be included in the batches of training data, processing parameters may be updated, and the like, in order to further and more fully train the machine learning model.

Figure 6A:
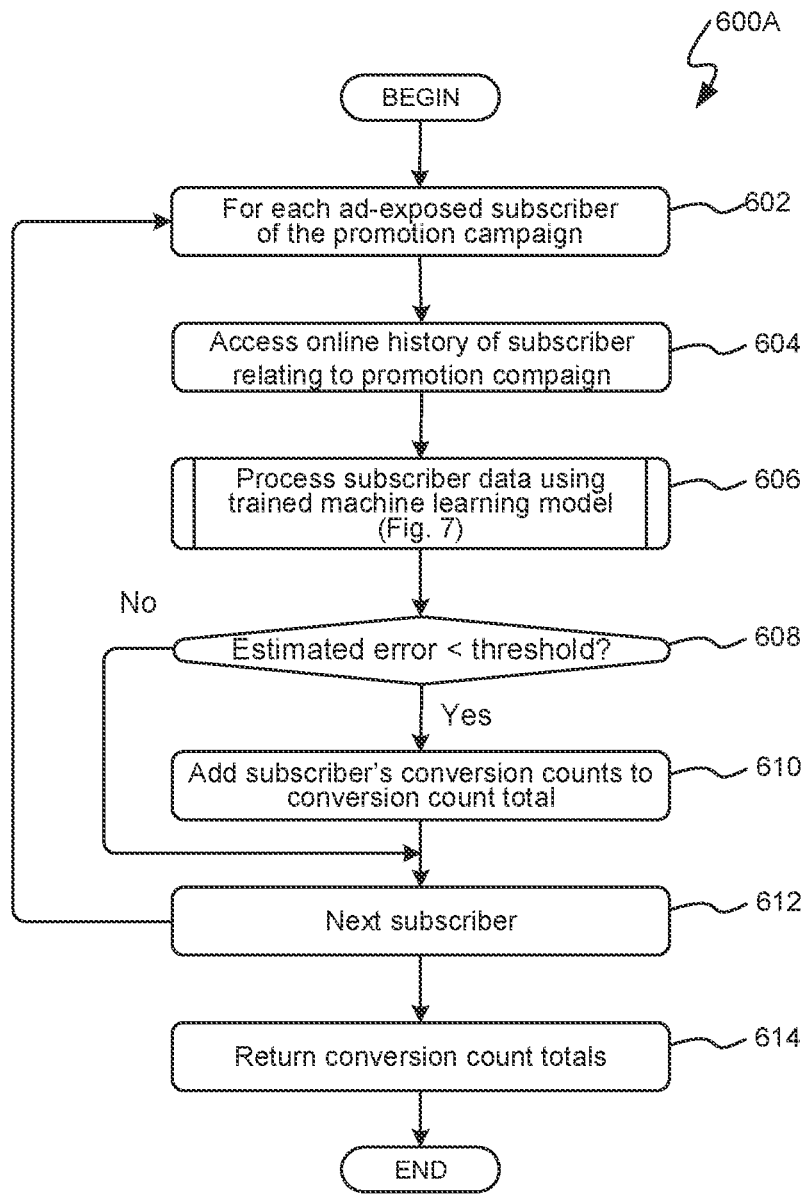
FIGS. 6A and 6B are flow diagrams illustrating exemplary, alternative routines for determining conversion counts for a promotion campaign according to exposed subscribers' promotion-related online behaviors and/or actions, in accordance with aspects of the disclosed subject matter.
Figure 6B:
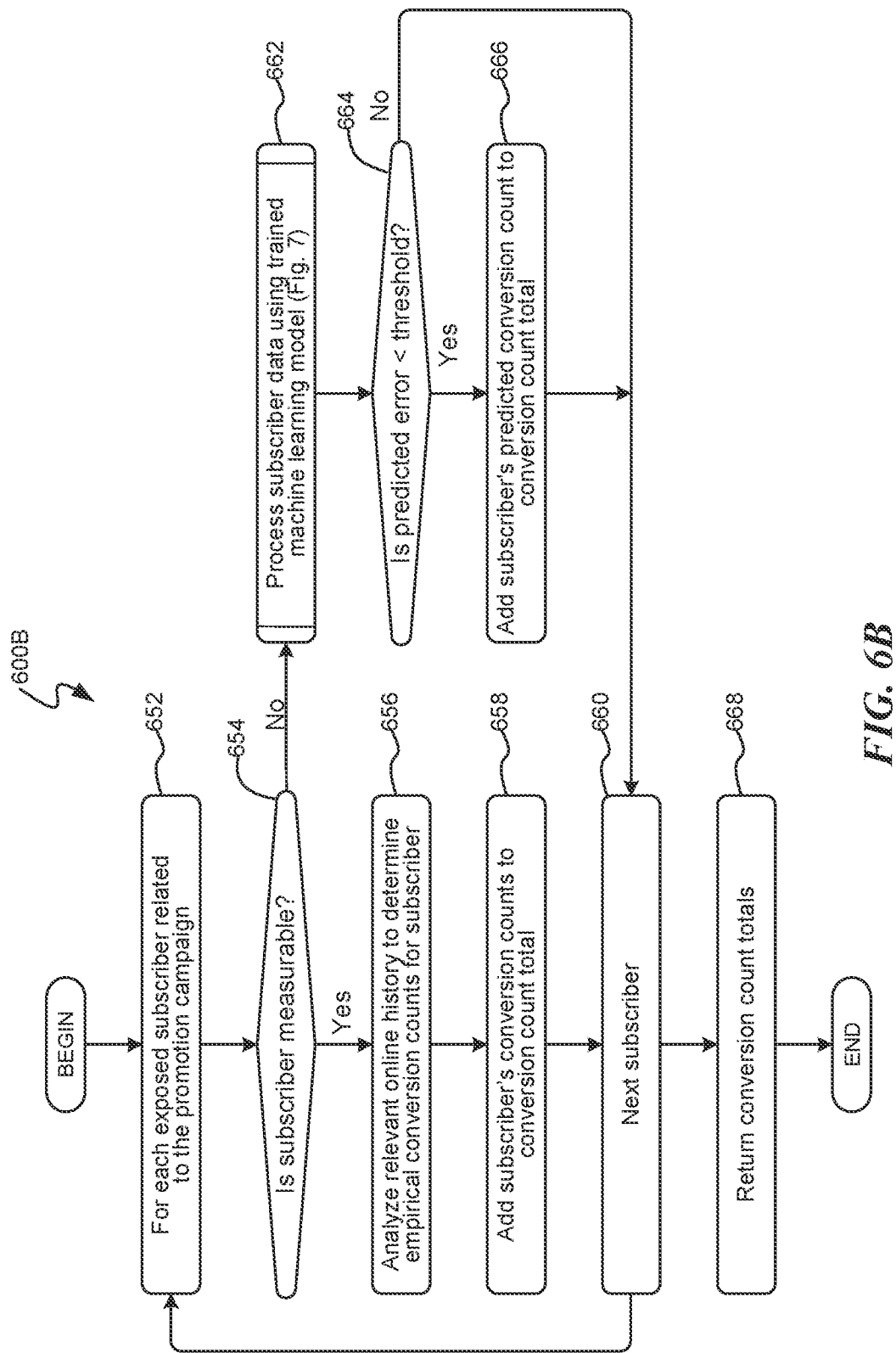

With a highly trained machine learning model, specifically trained to determine conversion counts from online behaviors, actions and/or activities of a subscriber, and especially for non-measurable subscribers, as mentioned above in regard to block 208 of FIG. 2, reference is now made to FIGS. 6A and 6B. FIGS. 6A and 6B are a flow diagram illustrating alternative, exemplary routines, e.g., routine 600A and routine 600B, for determining conversion counts of exposed subscribers according to their promotion-related online behaviors, actions and/or activities, in accordance with aspects of the disclosed subject matter.

Regarding routine 600A of FIG. 6A, this routine determines the conversion counts of the exposed subscribers by processing all exposed subscribers through the trained machine learning model. While more simple to illustrate in a flow diagram, it may or may not be more efficient in processing than routine 600B of FIG. 6B, which separates subscribers according to measurable/non-measurable, and for measurable subscribers performs a determinative analysis of their online behaviors, actions and/or activities relating to, or in response to the promotion campaign.

With reference first to routine 600A of FIG. 6A, at block 602 an iteration is begun to iterate through each of the exposed subscribers of the promotion campaign. At block 604, the online history relating to, or in response to, the promotion campaign of the currently iterated exposed subscriber is accessed. At block 606, the online history relating to, or in response to, the promotion campaign of the currently iterated exposed subscriber is processed by the now-trained, machine learning model, resulting in both a predicted conversion count for the currently-iterated subscriber as well as an estimated error rate corresponding to the predicted conversion count. Processing the online history relating to, or in response to, the promotion campaign of the currently iterated exposed subscriber by the trained machine learning model is set forth below in regard to FIG. 7.

At decision block 608, a determination is made as to whether the estimated error rate for the predicted conversion count is below an error threshold for accepting the predicted count as a count for the promotion campaign. If the estimated error rate falls below the error threshold (i.e., the estimated error rate indicates that the predicted conversion count is sufficiently accurate to include the predicted count in the total conversion counts for the promotion campaign), routine 600A proceeds to block 610 where the predicted count of the currently-iterated exposed subscriber is added to the total conversion count of the promotion campaign. Alternatively, if at decision block 608 the estimated error rate exceeds the error threshold, or after adding the predicted count to the total conversion count for the promotion campaign, at block 612 if there are additional exposed subscribers to process, the routine 600A returns to block 602 to further continue the iterative count of the exposed subscribers' conversions. However, if all exposed subscribers have been processed, routine 600A proceeds to block 614 where the total conversion count for the promotion campaign is returned.

With reference to routine 600B of FIG. 6B, beginning at block 652, an iteration is begun to process each of the exposed subscribers' promotion-related behaviors, actions and/or activities to determine an overall, total conversion count for the promotion campaign. As part of the iteration and with regard to a currently-iterated exposed subscriber, at block 654, a determination is made as to whether the currently-iterated exposed subscriber is a measurable subscriber, as discussed previously. If the currently-iterated exposed subscriber is determined to be a measurable subscriber, the routine 600B proceeds to block 656 in continuation of the iteration. Alternatively, if the currently-iterated exposed subscriber is determined to be a non-measurable subscriber, the routine 600B proceeds to block 662 in continuation of the iteration.

At block 656, (i.e., the currently-iterated exposed subscriber is a measurable subscriber) an evaluation and analysis of the online behaviors, actions and activities of the currently-iterated exposed subscriber is made, particularly in response to or relating to the promotion campaign. According to aspects of the disclosed subject matter, this evaluation is made in regard to the online behaviors and activities of the exposed subscriber on internet sites under the control of the online service, as well as the online behaviors and/or activities of the currently iterated exposed subscriber on internet sites or locations that are not under the control of the online service. This evaluation results in an empirical, actual conversion count for the currently-iterated exposed subscriber, determined from a sufficiently complete view of the subscriber's online behaviors and actions, with respect to the promotion campaign.

At block 658, this determined conversion count is added to an overall, total conversion count for the promotion campaign. Thereafter, the routine 600B proceeds to block 660. At block 660, if there are additional exposed subscribers to process, the routine 600B returns to block 652 to continue the iteration. Alternatively, if there are no additional exposed subscribers to process, the routine 600B proceeds to block 668, where the overall, total conversion counts for the promotion campaign are returned and the routine 600B terminates.

Returning to block 654, if it is determined that the currently-iterated exposed subscriber is a non-measurable subscriber, the routine 600B proceeds to block 662. At block 662, the exposed subscriber is processed by a trained machine learning model to predict conversion counts for the non-measurable, currently-iterated exposed subscriber, as well as produce an estimated error rate for the predicted conversion counts. Processing the exposed subscriber to predict conversion counts with respect to a promotion campaign, as well as to determine an estimated error rate for the predicted conversion counts, is set forth below in regard to FIG. 7. As indicated, processing the non-measurable, currently-iterated exposed subscriber results in a predicted conversion count for the exposed subscriber, and an estimated error rate corresponding to the predicted conversion count for the exposed subscriber.

At block 664, a determination is made as to whether the estimated error rate for the predicted conversion count for the exposed subscriber falls below a requisite threshold. Stated another way, at block 664, a determination is made as to whether the predicted conversion count for the currently-iterated exposed subscriber is viewed as sufficiently high such that the predicted conversion count may be included in the overall, total conversion counts for the promotion campaign. In various embodiments of the disclosed subject matter, this requisite threshold may be set at 5%, though a higher or lower threshold may be used. If the estimated error rate for the predicted conversion count falls below the requisite threshold, the routine proceeds to block 666 where the predicted conversion count is included in the overall total conversion counts for the promotion campaign.

After processing the non-measurable, currently-iterated exposed subscriber, at block 668, or if the predicted error rate falls above the requisite threshold, if there are additional exposed subscribers to process, the routine 600B returns to block 652 to continue the iteration(s). Alternatively and as indicted above, if there are no additional exposed subscribers to process, the routine 600B proceeds to block 668, where the overall, total conversion counts for the promotion campaign are returned and the routine 600B terminates.

Figure 7:
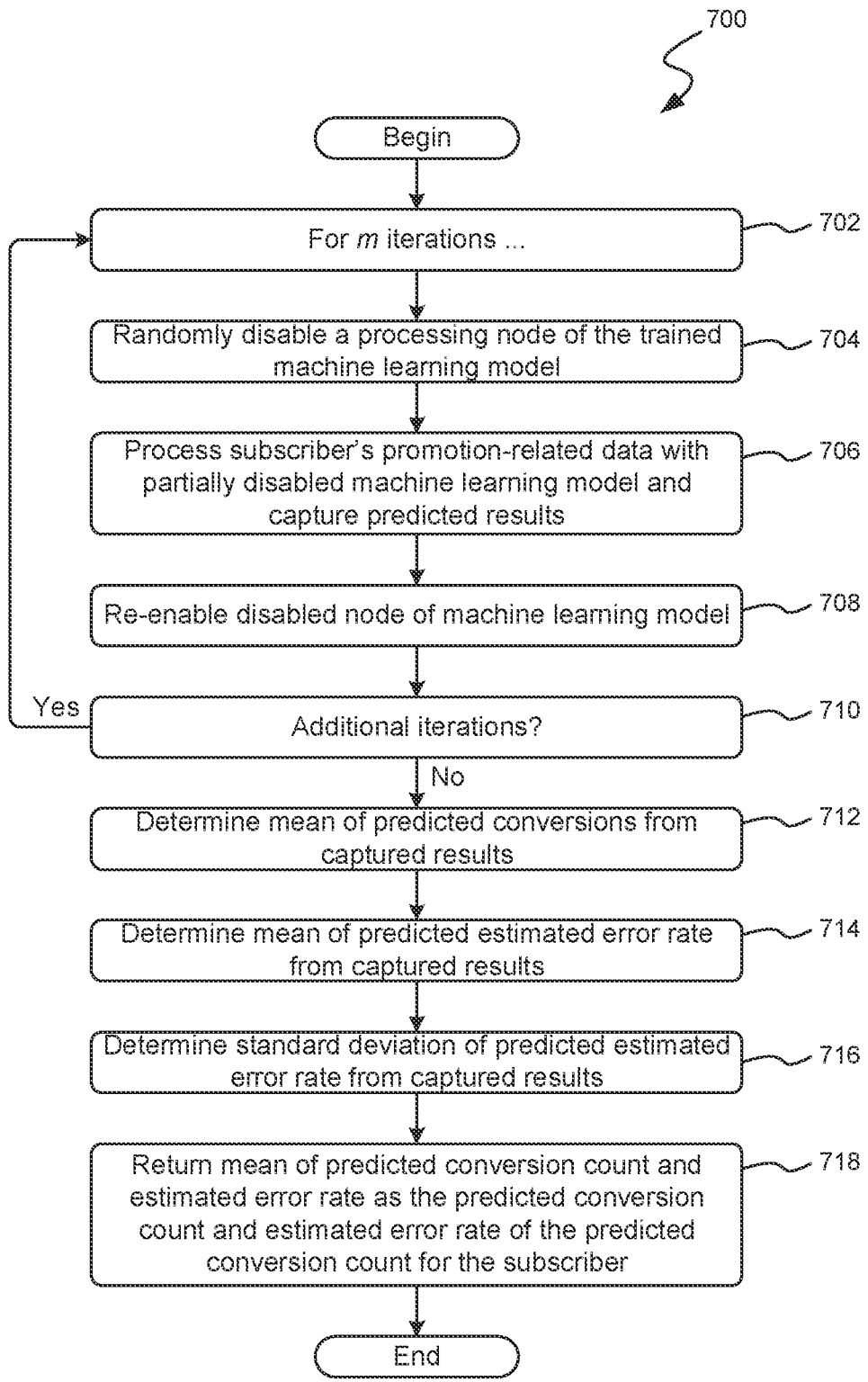
FIG. 7 is a flow diagram illustrating an exemplary routine for processing a subscriber's promotion-related behaviors and/or actions by a trained machine learning model to determine a predicted conversion count and an estimated error rate for the estimated conversion count, in accordance with aspects of the disclosed subject matter.

Turning to FIG. 7, FIG. 7 is a flow diagram illustrating an exemplary routine 700 for processing a non-measurable subscriber's promotion-related behaviors by a trained machine learning model to determine a predicted conversion count for a promotion campaign, and an estimated error rate for the estimated conversion count, in accordance with aspects of the disclosed subject matter. According to aspects of the disclosed subject matter, while this routine 700 is trained for the purpose of determining a conversion count, with an estimated error rate, from the online behaviors of a non-measurable exposed subscriber, it should be appreciated that this routine may be similarly used to measure the conversion counts of measurable subscribers.

At block 702, an iteration is begun to iteratively process the exposed subscriber's online behaviors, actions and activities in response to or relating to the promotion campaign. According to aspects of the disclosed subject matter, this iteration is carried out a predetermined number of times, denoted as m. By way of illustration, while the value of m may be any particular number over zero, in some embodiments m may be set to 10. Advantageously, by generating a plurality of predicted results for an exposed subscriber, particularly using drop-out techniques, a more realistic predicted conversion count, as well as an estimated error rate, are determined.

Consistent with drop-out techniques, at block 704, a processing node within the trained machine learning model is disabled. At block 706, the exposed subscriber's online behaviors, actions and activities in response to or relating to the promotion campaign, are processed by fully-enabled trained, partially disabled machine learning model and the results are captured, including the predicted conversion count for the exposed subscriber and an estimated error rate for the predicted conversion count.

At block 708, the disabled node of the machine learning model is re-enabled. At block 710, if there are additional iterations to perform, the routine 700 returns to block 702. Alternatively, if all m iterations have completed, the routine 700 proceeds to block 712.

At block 712, a mean value of the temporarily captured predicted conversion counts for the exposed subscriber is determined. In various embodiments, this mean value is rounded to the nearest whole number, though in alternative embodiments, any fractional portion of the mean value is truncated leaving the mean value as a whole number.

At block 714, a mean estimated error rate of the of the temporarily captured estimated error rates is determined. At block 716, a standard deviation is determined for the estimated error rates. At block 718, a mean value of the temporarily captured predicted conversion counts for the exposed subscriber (that may or may not be rounded or truncated to a whole number) is returned as the predicted conversion counts for the non-measurable subscriber. Additionally, the sum of the mean estimated error rate and the standard deviation for the captured estimated error rates is returned as the estimated error rate for the predicted conversion counts for the exposed subscriber. Thereafter, routine 700 terminates.

Regarding routines 200, 300, 400, 600A, 600B and 700 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computer system 900 described in FIG. 9 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors and switches such as if-then and if-then-else statements, assignments, arithmetic computations, and the like that, in execution, configure a computing device or computer system to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer-readable storage media, which (for purposes of this disclosure) are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure and unless specifically stated otherwise, claims of computer-readable media expressly exclude carrier waves and/or propagated signals.

Figure 8:
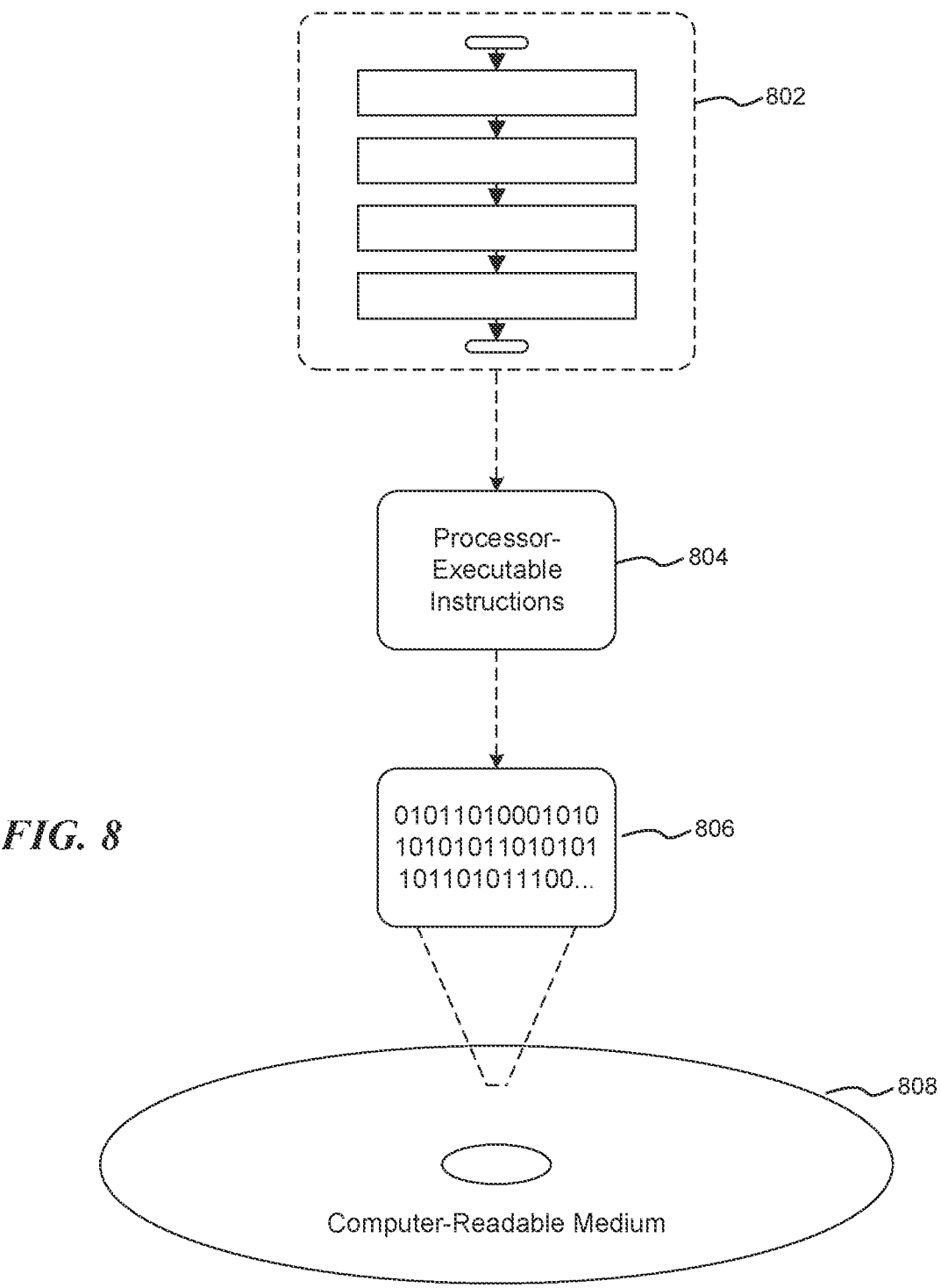
FIG. 8 is a block diagram illustrating exemplary computer-readable media encoded with instructions for conducting one or more elements of a promotion campaign and reporting corresponding conversion counts, formed in accordance with aspects of the disclosed subject matter.

Regarding computer-readable media, FIG. 8 is a block diagram illustrating an exemplary computer-readable medium 808 encoded with instructions for conducting one or more elements of a promotion campaign and reporting corresponding conversion counts, formed in accordance with aspects of the disclosed subject matter. More particularly, the illustrated implementation comprises a computer-readable medium 808 (e.g., a CD-R, DVD-R or a platter of a hard disk drive), on which is encoded computer-readable data 806. This computer-readable data 806 in turn comprises a set of processor-executable instructions 804 configured to operate according to one or more of the principles set forth herein. In one such embodiment 802, the processor-executable instructions 804 may be configured to perform a method, such as at least some of exemplary routines 200, 300, 400, 600A, 600B and 700, for example. In another such embodiment, the processor-executable instructions 804 may be configured to implement a system on a computing system or device, such as at least some of the exemplary, executable components of computer system 900, as discussed in FIG. 9 below. Many such computer-readable media may be devised, by those of ordinary skill in the art, which are configured to operate in accordance with the techniques presented herein.

Figure 9:
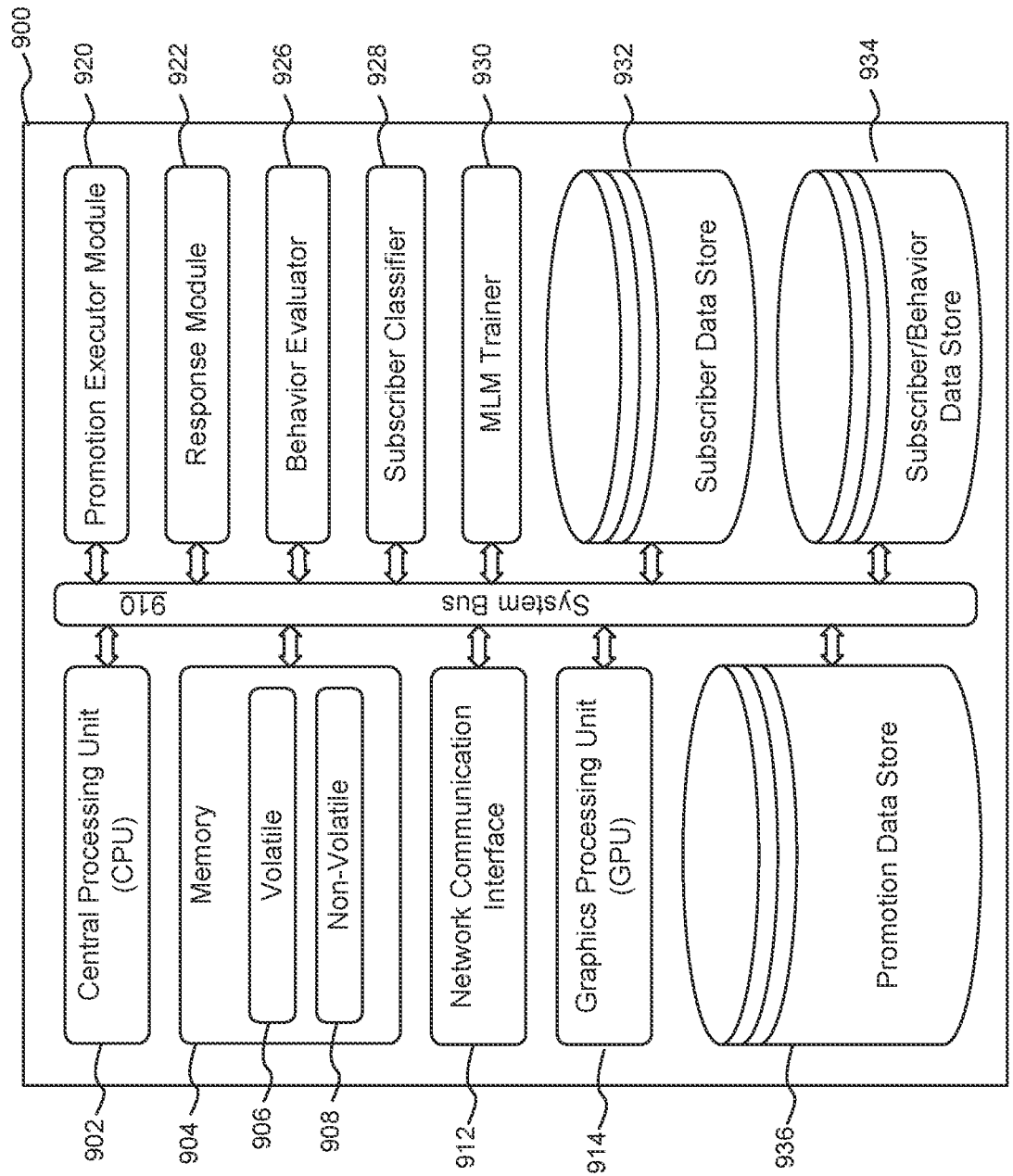
FIG. 9 is a block diagram illustrating exemplary components of a computer system suitable for implementing one or more elements of an online service, particularly in regard to elements for conducting a promotion campaign and reporting corresponding conversion counts of the promotion campaign, in accordance with aspects of the disclosed subject matter.

Turning to FIG. 9, FIG. 9 is a block diagram illustrating exemplary components of a computer system 900 suitable for implementing one or more elements of an online service, particularly in regard to elements for conducting a promotion campaign and reporting corresponding conversion counts of the promotion campaign, in accordance with aspects of the disclosed subject matter. The computer system 900 typically includes one or more central processing units (or CPUs), such as CPU 902, and further includes at least one memory, such as memory 904, from which executable instructions and data may be retrieved. The CPU 902 and memory 904, as well as other components of the computing system, are typically interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 can store (or persist) information even when a power supply is not available. In general, RAM and CPU cache memory are examples of volatile memory 906 whereas ROM, solid-state memory devices, memory storage devices, and/or memory cards are examples of non-volatile memory 908.

As will be also appreciated by those skilled in the art, the CPU 902 executes instructions retrieved from the memory 904 from computer-readable media, such as computer-readable medium 808 of FIG. 8, and/or other executable components, in carrying out the various functions of the disclosed subject matter. The CPU 902 may be comprised of any of several available processors, such as single-processor, multi-processor, single-core units, and multi-core units, which are well known in the art.

Further still, the illustrated computer system 900 typically also includes a network communication interface 912 for interconnecting this computing system with other devices, computers and/or services over a computer network, such as network 118 of FIG. 1. The network communication interface 912, sometimes referred to as a network interface card or NIC, communicates over a network using one or more communication protocols via a physical/tangible (e.g., wired, optical fiber, etc.) connection, a wireless connection such as Wi-Fi or Bluetooth communication protocols, NFC, or a combination thereof. As will be readily appreciated by those skilled in the art, a network communication interface, such as network communication interface 912, is typically comprised of hardware and/or firmware components (and may also include or comprise executable software components) that transmit and receive digital and/or analog signals over a transmission medium (i.e., the network 118).

The illustrated computer system 900 also frequently, though not exclusively, includes a graphics processing unit (GPU), such as GPU 914. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data, including the processing of online behaviors to predict conversion counts for a promotion campaign. One or more GPUs, such as GPU 914, are often viewed as essential processing components of a computing system when conducting machine learning techniques. Also, and according to various embodiments, while GPUs are often included in computer systems and available for training, processing and/or implementing machine learning models, multiple GPUs are also often deployed as online GPU services or farms and machine learning processing farms.

In addition to the above mentioned components, the computer system 900 also includes additional executable components that carry out one or more aspects of conducting a promotion campaign for a promoter, and determining conversion data for the promotion campaign in accordance with aspects of the disclosed subject matter. As shown in FIG. 9, the computer system 900 includes a promotion executor module 920. The promotion executor model 920, in execution on the computer system, identifies a set of exposed subscribers for the promotion campaign according to promotion campaign information that may be stored in a promotion data store 936, and further carries out the promotion campaign by providing or presenting promotion content, such as presentation content 128 of FIG. 1, to the exposed subscribers according to campaign criteria.

A response module 922, in execution on the computer system 900 and in conjunction with the promotion executor module 920, monitors and captures online behaviors and/or actions of the exposed subscribers in relation to the promotion campaign. According to some aspects of the disclosed subject matter, the response module 922 particularly captures online behaviors and actions of exposed subscribers that occur on internet locations that are under the control of the online service. Additionally, the response module 922 may be further configured to analyze online behaviors and actions of exposed subscribers that occur on internet locations that are not under the control of the online service, at least in regard to measurable exposed subscribers. These captured behaviors and actions may be stored in a subscriber/behavior data store 934.

A behavior evaluator 926, in execution on the computer system 900 and in conjunction with the promotion executor module 920, at the conclusion of the promotion campaign, evaluates the online behaviors and actions of the exposed subscribers to determine conversion counts of the promotion campaign. Typically, though not exclusively, the behavior evaluator 926 accesses the online behaviors, activities and/or actions of the various exposed subscribers, particularly in regard to behaviors and/or actions on internet locations under control of the online service, as maintained in the subscriber/behavior data store 934. Indeed, the behavior evaluator 926 determines conversion counts for both measurable exposed subscribers and non-measurable exposed subscribers through execution of the functionality described above in regard to routines 600 and 700.

A subscriber classifier 928, in execution on the computer system 900, operates to classify whether a subscriber of the online service (including, at least, exposed subscribers) is a measurable subscriber or a non-measurable subscriber. Information regarding the subscribers, including demographic information, may be maintained in a subscriber data store 932. As discussed above, the subscriber classifier 928 utilizes various evaluations, techniques and technologies to determine whether a given subscriber's online behaviors and/or actions or activities are sufficiently accessible/visible to the online service such that a deterministic evaluation, rather than a prediction, may be used to determine conversion counts of the subscriber in relation to a promotion campaign.

Still further, the computer system 900 includes a machine learning model trainer 930 that is used to train a machine learning model to predict conversion counts for target subscribers based on the online behaviors and/or actions or activities of the target subscribers. Training the machine learning model is described above in regard to routines 300 and 400.

Regarding the various components of the exemplary computer system 900, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method as implemented by an online service, the method comprising:
    conducting a third-party promotion campaign of presenting promotion content on behalf of a third-party promoter to subscribers of the online service;
    capturing online behaviors of a plurality of subscribers of the online service that were exposed to the promotion content of the third-party promotion campaign, each of the plurality of subscribers exposed to the promotion content being an exposed subscriber, wherein the captured online behaviors include online actions, behaviors and activities in response to or regarding the promotion content of the third-party promotion campaign;
    for each exposed subscriber, determining whether the exposed subscriber is a measurable subscriber or a non-measurable subscriber, wherein a measurable subscriber is an exposed subscriber of the online service whose online behaviors outside of interaction with the online service are accessible to and can be evaluated by the online service;
    training a machine learning model to predict a conversion count and an estimated error rate of the conversion count for an exposed subscriber regarding the third-party promotion campaign according to the exposed subscriber's online behavior in response to or regarding the third-party promotion campaign;
    after the third-party promotion campaign concludes:
        for each measurable subscriber:
            determining a conversion count of the measurable subscriber in response to or regarding the promotion content of the third-party promotion campaign; and
            adding the determined conversion count of the measurable subscriber to a total conversion count for the third-party promotion campaign;
        for each non-measurable subscriber:
            processing the captured online behaviors of the non-measurable subscriber by the trained machine learning model, the processing resulting in a predicted conversion count and an estimated error rate of the predicted conversion count for the non-measurable subscriber in response to or regarding the promotion content of the third-party promotion campaign;
            adding the predicted conversion count for the non-measurable subscriber to the total conversion count for the third-party promotion campaign upon a determination that the predicted estimated error rate of the predicted conversion count for the non-measurable subscriber falls below a predetermined error rate threshold; and
        storing the total conversion count in conjunction with the third-party promotion campaign.

2. The computer-implemented method of claim 1, wherein determining the conversion count of the measurable subscriber in response to or regarding the promotion content of the third-party promotion campaign comprises evaluating the online behaviors of the measurable subscriber to determine an empirical conversion count of the measurable subscriber in response to or regarding the promotion content of the third-party promotion campaign.

3. The computer-implemented method of claim 1, wherein training the machine learning model to predict a conversion count and an estimated error rate of the conversion count is conducted according to semi-supervised learning (SSL) techniques implementing regressive prediction.

4. The computer-implemented method of claim 1, wherein determining the conversion count of the measurable subscriber in response to or regarding the promotion content of the third-party promotion campaign comprises:
    processing the captured online behaviors of the measurable subscriber by the trained machine learning model, the processing resulting in a predicted conversion count and an estimated error rate of the predicted conversion count for the measurable subscriber in response to or regarding the promotion content of the third-party promotion campaign; and
    adding the predicted conversion count for the measurable subscriber to the total conversion count for the third-party promotion campaign upon a determination that the predicted estimated error rate of the predicted conversion count for the measurable subscriber falls below a predetermined error rate threshold.

5. The computer-implemented method of claim 4, further comprising:
    generating training data according to the captured online behaviors of the exposed subscribers;
    and wherein training the machine learning model to predict a conversion count and an estimated error rate according to captured online behaviors of an exposed subscriber regarding the third-party promotion campaign comprises training the machine learning model according to the generated training data.

6. The computer-implemented method of claim 5, wherein training the machine learning model according to the generated training data to predict a conversion count and an estimated error rate of an exposed subscriber regarding the third-party promotion campaign comprises:
    segmenting the training data into a plurality of batches of training data, each batch comprising training data elements of one or more exposed subscribers; and
    for each batch of training data of the plurality of batches:
        for a first plurality of iterations:
            randomly identifying a processing node of the machine learning model and disabling the randomly identified processing node;
            training the machine learning model with the disabled processing node according to the training data of the currently-iterated batch; and
            re-enabling the disabled processing node of the machine learning model.

7. The computer-implemented method of claim 4, wherein processing the captured online behaviors of the non-measurable subscriber by the trained machine learning model resulting in a predicted conversion count and an estimated error rate of the predicted conversion count for the non-measurable subscriber comprises:
for a plurality of iterations:
disabling a randomly identified processing node;
processing the online behaviors of the non-measurable subscriber by the trained machine learning model with the randomly disabled processing node and capturing the resulting predicted conversion count and the resulting estimated error rate of the predicted conversion count for the non-measurable subscriber; and
re-enabling the disabled processing node of the trained machine learning model;
combining the resulting predicted conversion counts of each iteration into a predicted conversion count for the non-measurable subscriber; and
combining the resulting estimated error rates of the predicted conversion counts of each iteration into an estimated error rate of the combined predicted conversion count for the non-measurable subscriber.

8. The computer-implemented method of claim 7, wherein combining the resulting predicted conversion counts into the predicted conversion count for the non-measurable subscriber comprises determining a mean value of the resulting predicted conversion counts, the mean value being the predicted conversion count for the non-measurable subscriber.

9. The computer-implemented method of claim 7, wherein combining the resulting estimated error rates of the predicted conversion counts into the estimated error rate of the combined predicted conversion count for the non-measurable subscriber comprises determining a mean value and a standard deviation value of the resulting estimated error rates of the predicted conversion counts and adding the mean value and a standard deviation value of the resulting estimated error rates, the resulting value being the predicted estimated error rate for the non-measurable subscriber.

10. A computer-readable medium bearing computer-executable instructions which, when executed by an online service operating on a computing system comprising at least a processor executing the instructions, carries out a method comprising:
conducting a third-party promotion campaign of presenting promotion content on behalf of a third-party promoter to subscribers of the online service;
capturing online behaviors of a plurality of subscribers of the online service that were exposed to the promotion content of the third-party promotion campaign, each of the plurality of subscribers exposed to the promotion content being an exposed subscriber, wherein the captured online behaviors include online actions, behaviors and activities in response to or regarding the promotion content of the third-party promotion campaign;
for each exposed subscriber, determining whether the exposed subscriber is a measurable subscriber or a non-measurable subscriber, wherein a measurable subscriber is an exposed subscriber of the online service whose online behaviors outside of interaction with the online service are accessible to and can be evaluated by the online service;
training a machine learning model to predict a conversion count and an estimated error rate of the conversion count for an exposed subscriber regarding the third-party promotion campaign according to the exposed subscriber's online behavior in response to or regarding the third-party promotion campaign;
after the third-party promotion campaign concludes:
for each measurable subscriber:
determining a conversion count of the measurable subscriber in response to or regarding the promotion content of the third-party promotion campaign; and
adding the determined conversion count of the measurable subscriber to a total conversion count for the third-party promotion campaign;
for each non-measurable subscriber:
processing the captured online behaviors of the non-measurable subscriber by the trained machine learning model, the processing resulting in a predicted conversion count and an estimated error rate of the predicted conversion count for the non-measurable subscriber in response to or regarding the promotion content of the third-party promotion campaign;
adding the predicted conversion count for the non-measurable subscriber to the total conversion count for the third-party promotion campaign upon a determination that the predicted estimated error rate of the predicted conversion count for the non-measurable subscriber falls below a predetermined error rate threshold; and
storing the total conversion count and the total estimated conversion count in conjunction with the third-party promotion campaign.

11. The computer-readable medium of claim 10, wherein determining the conversion count of the measurable subscriber in response to or regarding the promotion content of the third-party promotion campaign comprises evaluating the online behaviors of the measurable subscriber to determine an empirical conversion count of the measurable subscriber in response to or regarding the promotion content of the third-party promotion campaign.

12. The computer-readable medium of claim 10, wherein training the machine learning model to predict a conversion count and an estimated error rate of the conversion count is conducted according to semi-supervised learning (SSL) techniques implementing regressive prediction.

13. The computer-readable medium of claim 10, wherein determining the conversion count of the measurable subscriber in response to or regarding the promotion content of the third-party promotion campaign comprises:
processing the captured online behaviors of the measurable subscriber by the trained machine learning model, the processing resulting in a predicted conversion count and an estimated error rate of the predicted conversion count for the measurable subscriber in response to or regarding the promotion content of the third-party promotion campaign; and
adding the predicted conversion count for the measurable subscriber to the total conversion count for the third-party promotion campaign upon a determination that the predicted estimated error rate of the predicted conversion count for the measurable subscriber falls below a predetermined error rate threshold.

14. The computer-readable medium of claim 13, wherein the method further comprises:
generating training data according to the captured online behaviors of the exposed subscribers;

and wherein training the machine learning model to predict a conversion count and an estimated error rate according to captured online behaviors of an exposed subscriber regarding the third-party promotion campaign comprises training the machine learning model according to the generated training data.

15. The computer-readable medium of claim 14, wherein training the machine learning model according to the generated training data to predict a conversion count and an estimated error rate of an exposed subscriber regarding the third-party promotion campaign comprises:
   segmenting the training data into a plurality of batches of training data, each batch comprising training a data element of one or more exposed subscribers;
   for each batch of training data of the plurality of batches:
      for a first plurality of iterations:
         randomly identifying a processing node of the machine learning model and disabling the randomly identified processing node;
         training the machine learning model with the disabled processing node according to the training data of the currently-iterated batch; and
         re-enabling the disabled processing node of the machine learning model.

16. The computer-readable medium of claim 13, wherein processing the captured online behaviors of the non-measurable subscriber by the trained machine learning model resulting in a predicted conversion count and an estimated error rate of the predicted conversion count for the non-measurable subscriber comprises:
   for a plurality of iterations:
      disabling a randomly identified processing node;
      processing the online behaviors of the non-measurable subscriber by the trained machine learning model with the disabled processing node and capturing the resulting predicted conversion count and the resulting estimated error rate of the predicted conversion count for the non-measurable subscriber; and
      re-enabling the disabled processing node of the trained machine learning model;
   combining the resulting predicted conversion counts of each iteration into a predicted conversion count for the non-measurable subscriber; and
   combining the resulting estimated error rates of the predicted conversion counts of each iteration into an estimated error rate of the combined predicted conversion count for the non-measurable subscriber.

17. A computer system configured to conduct a campaign promotion of an online service for a promoter, the computer system comprising a processor and a memory, wherein the processor executes instructions stored in the memory as part of or in conjunction with additional components to respond to a text-based request, and configures the computer system to at least:
   conduct a third-party promotion campaign of presenting promotion content on behalf of a third-party promoter to subscribers of the online service;
   capture online behaviors of a plurality of subscribers of the online service that were exposed to the promotion content of the promotion campaign, each of the plurality of subscribers exposed to the promotion content being an exposed subscriber, wherein the captured online behaviors include online actions, behaviors and activities in response to or regarding the promotion content of the third-party promotion campaign;
   for each exposed subscriber, determining whether the exposed subscriber is a measurable subscriber or a non-measurable subscriber, wherein a measurable subscriber is an exposed subscriber of the online service whose online behaviors outside of interaction with the online service are accessible to and can be evaluated by the online service;
   train a machine learning model to predict a conversion count and an estimated error rate of the conversion count for an exposed subscriber regarding the third-party promotion campaign according to the exposed subscriber's online behavior in response to or regarding the third-party promotion campaign;
   after the third-party promotion campaign concludes:
      for each measurable subscriber:
         determine a conversion count of the measurable subscriber in response to or regarding the promotion content of the third-party promotion campaign; and
         add the determined conversion count of the measurable subscriber to a total conversion count for the third-party promotion campaign;
      for each non-measurable subscriber:
         process the captured online behaviors of the non-measurable subscriber by the trained machine learning model, the processing resulting in a predicted conversion count and an estimated error rate of the predicted conversion count for the non-measurable subscriber in response to or regarding the promotion content of the third-party promotion campaign;
         add the predicted conversion count for the non-measurable subscriber to the total conversion count for the third-party promotion campaign upon a determination that the predicted estimated error rate of the predicted conversion count for the non-measurable subscriber falls below a predetermined error rate threshold; and
      store the total conversion count in conjunction with the third-party promotion campaign.

18. The computer system of claim 17, wherein the computer system is further configured to, at least:
   generate training data according to the captured online behaviors of the exposed subscribers;
   and wherein the machine learning model is trained to predict a conversion count and an estimated error rate according to captured online behaviors of an exposed subscriber regarding the third-party promotion campaign comprises training the machine learning model according to the generated training data.

19. The computer system of claim 18, wherein in training the machine learning model according to the generated training data to predict a conversion count and an estimated error rate of an exposed subscriber regarding the third-party promotion campaign, the computer system is configured to, at least:
   segment the training data into a plurality of batches of training data, each batch comprising training a data element of one or more exposed subscribers;
   for each batch of training data of the plurality of batches:
      for a first plurality of iterations:
         randomly identify a processing node of the machine learning model and disabling the randomly identified processing node;
         train the machine learning model with the disabled processing node according to the training data of the currently-iterated batch; and
         re-enable the disabled processing node of the machine learning model.

20. The computer system of claim 18, wherein in processing the captured online behaviors of the non-measurable subscriber by the trained machine learning model resulting in a predicted conversion count and an estimated error rate of the predicted conversion count for the non-measurable subscriber, the computer system is further configured to, at least:

for a plurality of iterations:
disable a randomly identified processing node;
process the online behaviors of the non-measurable subscriber by the trained machine learning model with the disabled processing node and capturing the resulting predicted conversion count and the resulting estimated error rate of the predicted conversion count for the non-measurable subscriber; and
re-enable the disabled processing node of the trained machine learning model;
combine the resulting predicted conversion counts of each iteration into a predicted conversion count for the non-measurable subscriber; and
combine the resulting estimated error rates of the predicted conversion counts of each iteration into an estimated error rate of the combined predicted conversion count for the non-measurable subscriber.

\* \* \* \* \*